(12) United States Patent
Yokozeki

(10) Patent No.: US 10,165,174 B2
(45) Date of Patent: Dec. 25, 2018

(54) CONTROL APPARATUS, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Makoto Yokozeki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/475,545

(22) Filed: Mar. 31, 2017

(65) Prior Publication Data

US 2017/0289437 A1 Oct. 5, 2017

(30) Foreign Application Priority Data

Apr. 4, 2016 (JP) .................................. 2016-074871

(51) Int. Cl.
*H04N 5/232* (2006.01)

(52) U.S. Cl.
CPC .............................. *H04N 5/23212* (2013.01)

(58) Field of Classification Search
CPC .............................................. H04N 5/232212
See application file for complete search history.

(56) References Cited

U.S. PATENT DOCUMENTS

| 2011/0080488 A1* | 4/2011 | Okamoto | ............... G03B 17/14 |
| | | | 348/220.1 |
| 2014/0247384 A1* | 9/2014 | Hokkezu | .................. G02B 7/36 |
| | | | 348/345 |

FOREIGN PATENT DOCUMENTS

JP 2010-063162 A 3/2010

* cited by examiner

*Primary Examiner* — Christopher K Peterson
(74) *Attorney, Agent, or Firm* — Cowan, Liebowitz & Latman, P.C.

(57) ABSTRACT

A control apparatus includes a focus signal generator (112) which generates a focus signal by using a component of a predetermined frequency band of an image signal and a controller (114) which performs in-focus control based on the focus signal, the controller performs minute drive of reciprocating a focus lens in an optical axis direction in the in-focus control, and the controller changes each of a reciprocation period and the predetermined frequency band depending on a focus state or an image capturing condition in the minute drive.

19 Claims, 13 Drawing Sheets

CONTROL APPARATUS, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to a control apparatus which performs autofocus control by a contrast detection method.

Description of the Related Art

Recently, an image capturing apparatus such as a video camera with high definition and with a shallow depth of focus appears. Commonly, in autofocus (AF) control by a TV-AF method (contrast detection method), a focus lens is minutely driven in an optical axis direction. Typically, a reciprocation width (amplitude) of the minute drive is set within a depth of focus. Accordingly, as the definition is higher and the depth of focus is shallower, the amplitude needs to be decreased. As a result, by using AF evaluation values (signals indicating focus states) with a BPF band similar to conventional arts, it is difficult to obtain a sufficient difference of the AF evaluation values by the minute drive while an image is blurred, and accordingly there is a possibility that it takes a long time to find an in-focus direction.

Furthermore, since the number of pixels increases and a period (frame rate) for processing a video signal is lowered compared to conventional arts, a reciprocation time of the minute drive is extended and it takes a long time to find the in-focus direction. Accordingly, in a scene where an image is blurred due to a change of an object by a user or the like, there is a high possibility that the blurred image is recorded in a long time.

Japanese Patent Laid-open No. 2010-063162 discloses a camera system which is capable of selecting a low-speed tracking mode and a high-speed tracking mode by an operation of a user.

However, in the camera disclosed in Japanese Patent Laid-open No. 2010-063162, the operation of the user is needed to select the low-speed tracking mode and the high-speed tacking mode, and accordingly it is complicated for the user. When a period of the minute drive is set to a high period in the high-speed tracking mode, drive timing control of the focus lens needs to be changed depending on a state of the camera of an object, and this is not disclosed in Japanese Patent Laid-open No. 2010-063162. Therefore, in the camera disclosed in Japanese Patent Laid-open No. 2010-063162, high-speed in-focus control cannot be performed and thus there is a possibility that a blurred image is recorded in a long time.

SUMMARY OF THE INVENTION

The present invention provides a control apparatus, an image capturing apparatus, a control method, and a non-transitory computer-readable storage medium which are capable of performing high-speed in-focus control.

A control apparatus as one aspect of the present invention includes a focus signal generator configured to generate a focus signal by using a component of a predetermined frequency band of an image signal, and a controller configured to perform in-focus control based on the focus signal, the controller is configured to perform minute drive of reciprocating a focus lens in an optical axis direction in the in-focus control, and change each of a reciprocation period and the predetermined frequency band depending on a focus state or an image capturing condition in the minute drive.

An image capturing apparatus as another aspect of the present invention includes an image sensor configured to photoelectrically convert an optical image formed via an image capturing optical system including a focus lens to output image data and the control apparatus.

A control method as another aspect of the present invention includes the steps of generating a focus signal by using a component of a predetermined frequency band of an image signal, and performing in-focus control based on the focus signal, performing the in-focus control includes performing minute drive of reciprocating a focus lens in an optical axis direction during the in-focus control, and performing the minute drive includes changing each of a reciprocation period and the predetermined frequency band depending on a focus state or an image capturing condition.

A non-transitory computer-readable storage medium as another aspect of the present invention stores a program which causes a computer to execute the control method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

<Configuration of Image Capturing Apparatus>

Figure 1:
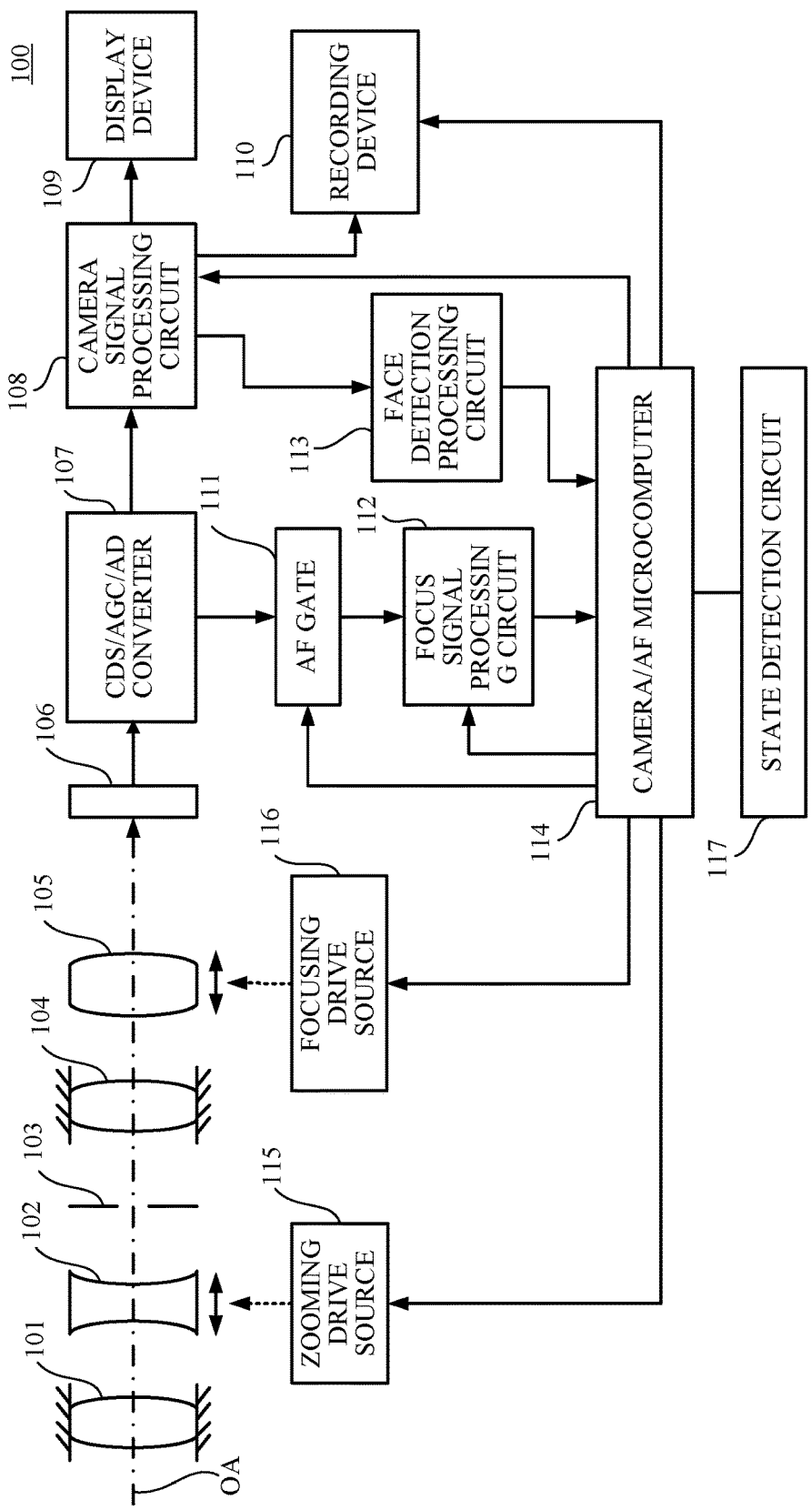
FIG. 1 is a block diagram of illustrating a configuration of an image capturing apparatus in this embodiment.

First, referring to FIG. 1, an image capturing apparatus in this embodiment will be described. FIG. 1 is a block diagram of illustrating a configuration of an image capturing apparatus 100 (video camera) in this embodiment. In contrast AF control, the image capturing apparatus 100 changes a period of driving a focus lens and a BPF band for generating a focus evaluation value that is to be used for determining an in-focus direction depending on a situation of a camera or an object to shorten a time of determining the in-focus direction and an in-focus time. While this embodiment describes a video camera as the image capturing apparatus 100, it is not limited thereto and it can also be applied to other image capturing apparatuses such as a digital still camera.

In FIG. 1, reference numeral 101 denotes a first fixed lens, reference numeral 102 denotes a magnification varying lens that moves in a direction (optical axis direction) along an optical axis OA to perform magnification, and reference numeral 103 denotes an aperture stop. Reference numeral 104 denotes a second fixed lens. Reference numeral 105 denotes a focus compensator lens (hereinafter, referred also to as a focus lens or a focus adjusting member) for performing focus adjustment of an optical system for image capturing, which has a function of correcting a movement of a focal plane due to the image capturing and a function of focusing. The first fixed lens 101, the magnification varying lens 102, the aperture stop 103, the second fixed lens 104, and the focus lens 105 constitute the image capturing optical system. Reference numeral 106 denotes an image sensor as a photoelectric conversion element including a CCD sensor or a CMOS sensor.

The image sensor 106 photoelectrically converts an optical image formed via the image capturing optical system including the focus lens 105 to output image data. Reference numeral 107 denotes a CDS/AGC/AD converter that performs sampling, gain control, and digitalizing of an output signal (image data) from the image sensor 106. Reference numeral 108 denotes a camera signal processing circuit (signal processor) that performs various image processing on an output signal from the CDS/AGC/AD converter 107 to generate a video signal (image signal corresponding to the image data). Reference numeral 109 denotes a display device that displays the video signal from the camera signal processing circuit 108. Reference numeral 110 denotes a recording device that records the video signal from the camera signal processing circuit 108 in a recording medium such as a magnetic tape, an optical disk, or a semiconductor memory. Reference numeral 111 denotes an AF gate that only passes a signal of a region which is to be used for focus detection in output signals for all pixels from the CDS/AGC/AD converter 107. The AF gate 111 is capable of generating the focus signal with respect to the region (AF frame) set by a camera/AF microcomputer 114 described below.

Reference numeral 112 denotes a focus signal processing circuit (focus signal generator). The focus signal processing circuit 112 includes a band-pass filter (BPF), and it extracts a high frequency component (i.e., a component of a predetermined frequency band) from the signal (image signal) passing through the AF gate 111 to generate the focus signal. In other words, the focus signal processing circuit 112 generates the focus signal by using the component of the predetermined frequency band of the image signal. While this focus signal indicates a value of sharpness (contrast state) of a video generated based on the output signal from the image sensor 106, the sharpness of the vide in an in-focus state is high, and the sharpness of a blurred image is low, and accordingly it can be used as a value representing a focus state of the image capturing optical system. The focus signal processing circuit 112 generates a signal such as a luminance difference value (difference between a maximum value and a minimum value of a luminance level of the signal passing through the AF gate 111) in addition to the focus signal in addition to the focus signal.

Reference numeral 113 denotes a face detection processing circuit (object detector) that performs known face recognition processing on the image signal to detect a position and a size of the face region of an object in an image capturing screen. As the known face recognition processing, for example, a flesh region is extracted from a gradation color of each pixel that is represented by the image data to detect the face according to a matching degree with a previously-prepared face contour plate, a method of performing a pattern recognition based on a feature point of the extracted face such as eyes, a nose, a mouse, or the like. The face detection processing circuit 113 sends a detection result to the camera/AF microcomputer 114 described below.

The camera/AF microcomputer 114 sends information to the AF gate 111 so that the AF frame is set at a position including the face region in the image capturing screen based on the detection result by the face detection processing circuit 113. When a plurality of face regions are detected by the face detection processing circuit 113, the camera/AF microcomputer 114 automatically selects a main face as a target of focusing from among the face regions. As a processing method of selecting the main face, there is a known method of automatically selecting, as the main face, a face which is large in size and located close to the center of the screen based on a size and a position of the face. When a user specifies the main face by using a main face selection operation portion (not illustrated), the camera/AF microcomputer 114 selects the face specified by the user as the main face based on the information. When an object selected as the main face is out of the image capturing screen, a main face is selected again from among other face regions in the image capturing screen.

The camera/AF microcomputer 114 controls a zooming drive source 115 and a focusing drive source 116 described below based on an output signal of the focus signal processing circuit 112 to drive the focus lens 105, and it also outputs an image recording command to the recording device 110. The camera/AF microcomputer 114 sets the AF frame and selects the main face described above. The camera/AF microcomputer 114 also performs various AF control processing of this embodiment described above, i.e., performs in-focus control based the focus signal. The processing is performed by the camera/AF microcomputer 114 repeatedly for each predetermined period (for example, generation period of a vertical synchronizing signal of the video signal). In this embodiment, this period and this timing are called a V period and a V timing, respectively. In this embodiment, the camera/AF microcomputer 114 is a controller including at least one processor. In this embodiment, a control apparatus is constituted at least by the focus signal processing circuit 112 and the camera/AF microcomputer 114.

Reference numeral 115 denotes a zooming drive source that includes an actuator for moving the magnification varying lens 102 and a drive circuit of the actuator. Reference numeral 116 denotes a focusing drive source that includes an actuator for moving the focus lens 105 and a drive circuit of the actuator. Each of the zooming drive source 115 and the focusing drive source 116 includes the actuator such as a stepping motor, a DC motor, a vibration motor, and a voice coil motor. Reference numeral 117 denotes a state detection circuit that detects a state of the image capturing apparatus 100. The state detection circuit 117 is for example a panning detector that detects panning (panning state) of the image capturing apparatus 100.

<TV-AF Control>

Figure 2A:
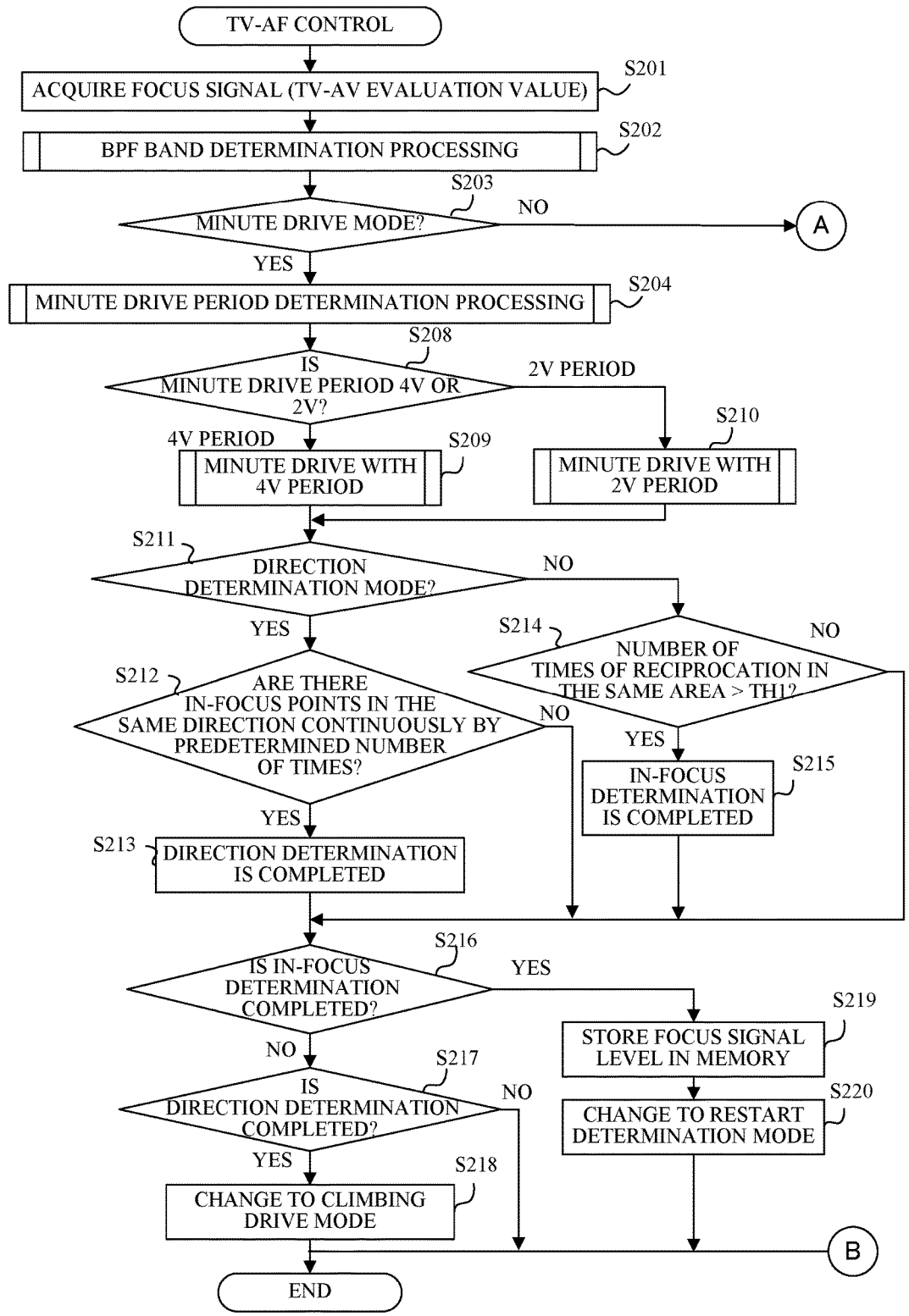
FIGS. 2A and 2B are flowcharts of illustrating an entire operation of TV-AF control in this embodiment.
Figure 2B:
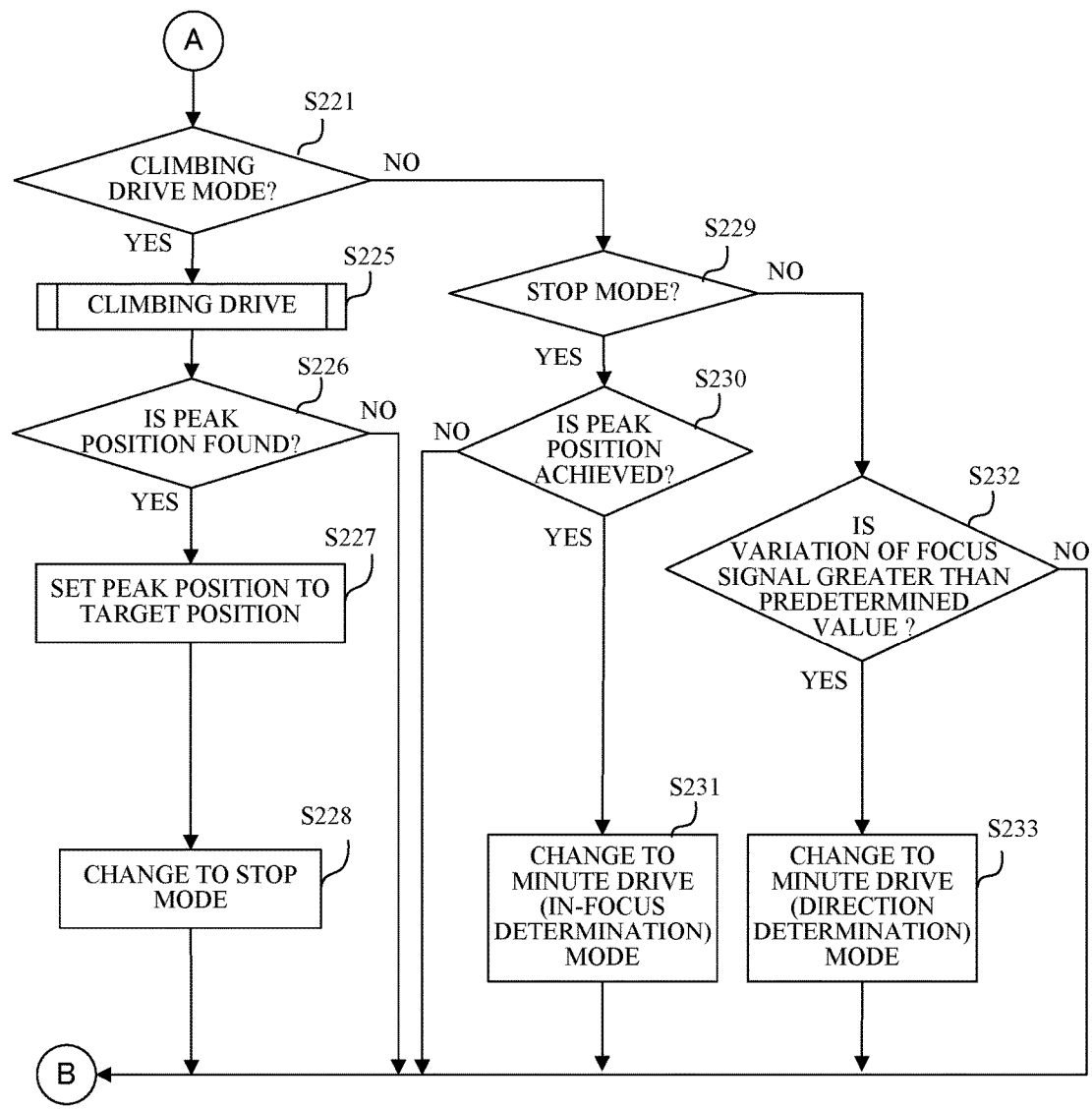

Next, referring to FIGS. 2A and 2B, TV-AF control (contrast AF control) will be described. FIGS. 2A and 2B are flowcharts of illustrating an entire operation of the TV-AF control. Each step of FIGS. 2A and 2B is performed repeatedly per a predetermined period (for example, a period of generation of the vertical synchronizing signal of the video signal) based on an instruction of the camera/AF microcomputer 114.

First, at step S201, the camera/AF microcomputer 114 acquires a focus signal (AF evaluation value) output from the focus signal processing circuit 112. Subsequently, at step S202, the camera/AF microcomputer 114 performs BPF band determination processing. Details of the BPF band determination processing will be described below referring to FIG. 5. Subsequently, at step S203, the camera/AF microcomputer 114 determines whether a mode is set to a minute drive mode described below. When the mode is set to the minute drive mode, the flow proceeds to step S204. On the other hand, when the mode is not set to the minute drive mode, the flow proceeds to step S221.

At step S204, the camera/AF microcomputer 114 performs minute drive period determination processing. Details of the minute drive period determination processing will be described below referring to FIGS. 3 and 4. Subsequently, at step S208, the camera/AF microcomputer 114 determines (confirms) whether the period determined at step S204, that is, a processing period (reciprocating cycle) of the minute drive is 4V period (first period) or 2V period (second period). When this period is the 4V period, the flow proceeds to step S209. On the other hand, when this period is the 2V period, the flow proceeds to step S210.

At step S209, the camera/AF microcomputer 114 performs the minute drive (4V modulation) with the 4V period, and then the flow proceeds to step S211. At step S210, the camera/AF microcomputer 114 performs the minute drive (2V modulation) with the 2V period, and then the flow proceeds to step S211. Details of the 4V modulation and the 2V modulation will be described below referring to FIGS. 6A, 6B, 7, 9A, and 9B.

At step S211, the camera/AF microcomputer 114 determines whether the mode is currently set to a direction determination mode. When the mode is set to the direction determination mode, the flow proceeds to step S212. On the other hand, when the mode is not set to the direction determination mode, the flow proceeds to step S214.

At step S212, the camera/AF microcomputer 114 determines whether in-focus points exist in the same direction continuously by the predetermined number of times. When the in-focus points exist in the same direction continuously by the predetermined number of times, the flow proceeds to step S213. At step S213, the camera/AF microcomputer 114 determines that the direction determination is completed, and then the flow proceeds to step S216. On the other hand, when the in-focus points do not exist in the same direction continuously by the predetermined number of times at step S212, the flow proceeds to step S216.

At step S214, the camera/AF microcomputer 114 determines whether the number of times of the reciprocation in a common area (within a range of a predetermined width) where a moving state of the focus lens is a predetermined state is not less than a threshold value TH1. When the focus lens is located near an in-focus position, i.e., near a position where the focus signal is maximized, a level of the focus signal decreases in both cases where the focus lens is driven in an infinite direction and in a close-range direction. Therefore, the focus lens repeats the reciprocation in the vicinity of the in-focus position in the minute drive. Accordingly, as described above, whether the focus lens is located near the in-focus position (in an almost in-focus state) can be determined by the number of times of the reciprocation in the predetermined common area. When the number of times of the reciprocation is not less than the threshold value TH1 as a result of the repetition of the inversion by not less than the predetermined number of times, the flow proceeds to step S215. At step S215, the camera/AF microcomputer 114 determines that the in-focus determination is completed. On the other hand, when the number of times of the reciprocation is less than the threshold value TH1 at step S214, the flow proceeds to step S216.

At step S216, the camera/AF microcomputer 114 determines whether the in-focus determination is performed at step S214. When the in-focus determination is performed, the flow proceeds to step S219. On the other hand, when the in-focus determination is not performed, the flow proceeds to step S217. At step S217, the camera/AF microcomputer 114 determines whether the direction determination is completed at step S212. When the direction determination is completed, the flow proceeds to step S218 to be moved to a climbing operation (a climbing drive mode). On the other hand, when the direction determination is not completed, the flow returns to step S201, and the camera/AF microcomputer 114 continues the minute drive mode. At step S219, the camera/AF microcomputer 114 stores the level of the focus signal for the in-focus state in a memory, and then the flow proceeds to step S220 to be changed to a restart determination mode.

At step S221, the camera/AF microcomputer 114 determines whether the mode is set to the climbing drive mode described below. When the mode is set to the climbing drive mode, the flow proceeds to step S225. On the other hand, when the mode is not set to the climbing drive mode, the flow proceeds to step S229.

At step S225, the camera/AF microcomputer 114 performs the climbing drive operation to perform the climbing drive of the focus lens at a predetermined speed in a direction where the focus signal increases. A detail operation related to the climbing drive will be described below referring to FIG. 8.

At step S226, the camera/AF microcomputer 114 determines whether a peak position of the focus signal is found as a result of the climbing drive operation at step S225. When the peak position is found, the flow proceeds to step S227. On the other hand, when the peak position is not found, the flow returns to step S201 to continue the climbing drive mode. At step S227, the camera/AF microcomputer 114 sets, as a target position, a focus lens position where the focus signal is peaked, and then the flow proceeds to step S228 to be changed to a stop mode.

At step S229, the camera/AF microcomputer 114 determines whether the mode is set to the stop mode. When the mode is set to the stop mode, the flow proceeds to step S230. On the other hand, when the mode is not set to the stop mode, the flow proceeds to step S232. At step S230, the camera/AF microcomputer 114 determines whether the focus lens 105 is returned to the peak position of the focus signal. When the focus lens 105 is returned to the peak position, the flow proceeds to step S231 to be changed to the minute drive (in-focus determination) mode. On the other hand, when the focus lens 105 is not returned to the peak position, the flow returns to step S201 to continue the stop mode.

At step S232, the camera/AF microcomputer 114 compares a current focus signal level with a focus signal level memorized (stored) at step S219, and it determines whether a variation of the focus signal is greater than a predetermined value. When the variation of the focus signal is greater than the predetermined value, the flow proceeds to step S233 to be changed to the minute drive (direction determination) mode. On the other hand, when the variation of the focus signal is less than the predetermined value, the flow returns to step S201 to continue the restart determination mode.

Preferably, when a rate of a maximum value of the focus signal with respect to a maximum value of the contrast value for each horizontal line of the image signal is not less than a predetermined rate (i.e., when a first condition is satisfied), the camera/AF microcomputer 114 determines that the focus state is the almost in-focus state. When the number of times of the reciprocation of the focus lens 105 at the position where the focus signal is maximized within the predetermined range is not less than the predetermined number of times (i.e., when a second condition is satisfied), the camera/AF microcomputer 114 determines that the focus state is the almost in-focus state. Preferably, when at least one of the first condition and the second condition is satisfied, the camera/AF microcomputer 114 determines that the focus state is the almost in-focus state.

Preferably, the camera/AF microcomputer 114 changes the predetermined range depending on the reciprocation period (i.e., minute drive period). More preferably, the camera/AF microcomputer 114 sets a first range as the predetermined range when the reciprocation period is the first period (4V period), and it sets a second range wider than the first range as the predetermined range when the reciprocation period is the second period (2V period).

<4V Modulation Operation and 2V Modulation Operation>

Figure 9A:
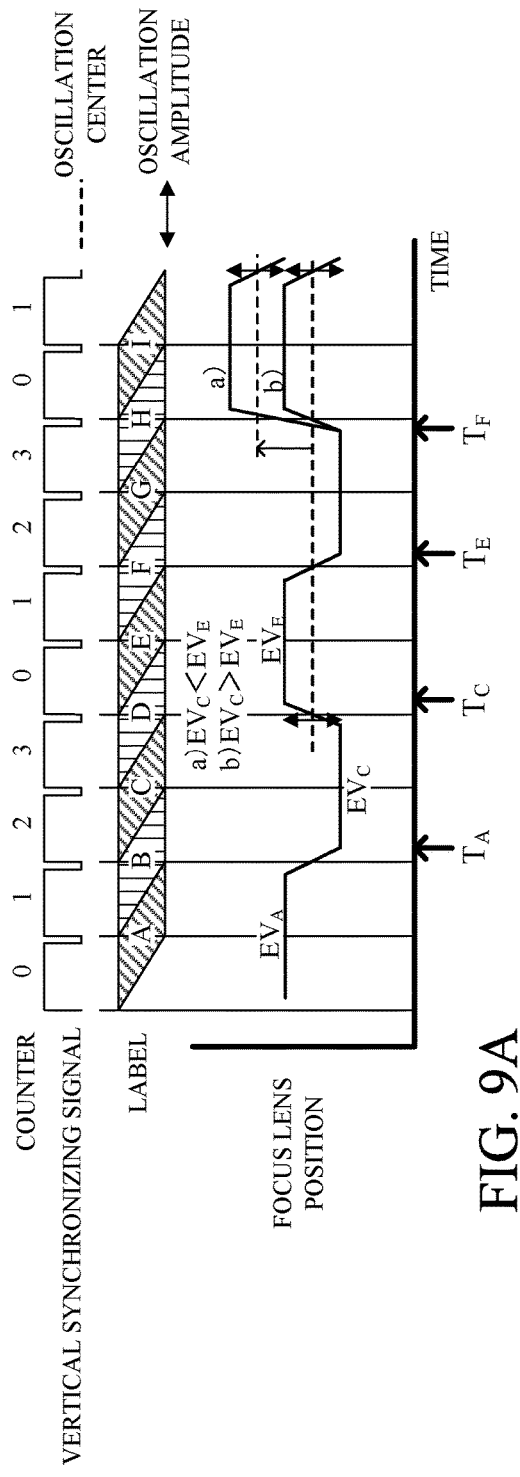
FIGS. 9A and 9B are explanatory diagrams of operations of a focus lens in a minute drive mode in this embodiment.
Figure 9B:
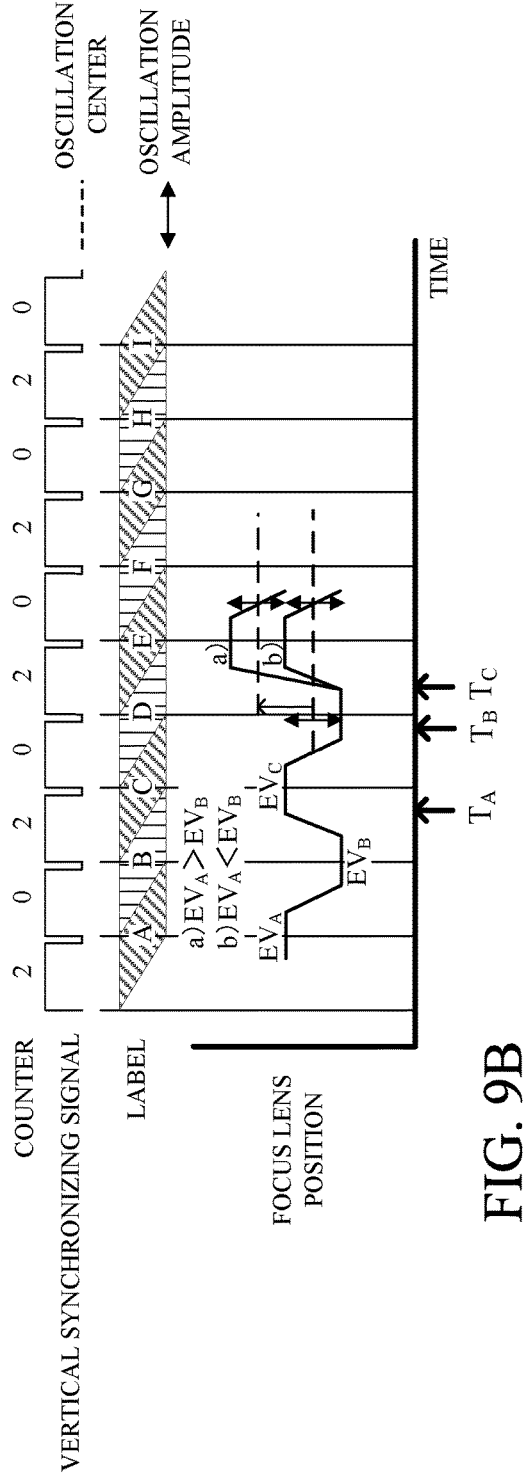

Next, referring to FIGS. 9A and 9B, an operation of the focus lens in each of the 4V modulation operation and the 2V modulation operation will be described. FIGS. 9A and 9B are operational diagram of the focus lens in the minute drive mode, and FIG. 9A illustrates the 4V modulation operation and FIG. 9B illustrates the 2V modulation operation.

On the upper side in each of FIGS. 9A and 9B, a vertical synchronizing signal of the video signal are illustrated. A label at the center in the drawing expresses a situation of accumulation and readout of the video signal to the image sensor 106, and the trapezoid of the video at each of A to I represents rolling shutter control by the CMOS. On the lower side of each drawing, a relationship between a time and the position of the focus lens 105, a vertical line indicates a time, and the vertical axis indicates a position of the focus lens 105.

First, referring to FIG. 9A, the 4V modulation operation will be described. In FIG. 9A, symbols $EV_A$, $EV_C$, and $EV_E$ are focus signals with respect to video signals with labels A, C, and E, respectively. The focus signals $EV_A$, $EV_C$, and $EV_E$ are incorporated into the camera/AF microcomputer 114 at the timing of times $T_A$, $T_C$, and $T_E$, respectively. At a time $T_F$, the level of the focus signal $EV_C$ is compared with the level of the focus signal $EV_E$, and the center of oscillation moves only when the level of the focus signal $EV_E$ is greater than the level of the focus signal $EV_C$. In other words, when a level of a latest focus signal is greater than a level of a previous focus signal, the center of the oscillation moves. The movement of the focus lens 105 is set based on a depth of focus and it is set to a moving amount that cannot be recognized on the screen.

While the camera/AF microcomputer 114 receives a focus signal $EV_D$ (not illustrated) with respect to a video signal accumulated in the image sensor 106 at a time of a label D as well, it is not incorporated during the 4V modulation operation. This is because a time period of accumulating the video signal of the label D is in the process of driving the focus lens 105 to a next target position and it cannot be used as a focus signal for determining the in-focus direction.

As described above, in the 4V modulation, the focus signal used for the comparison and the evaluation is a focus signal obtained when the focus lens 105 reaches the target position, and accordingly a change of the focus signal is easily detected even when the focus lens 105 minutely moves near the in-focus position. With respect to a scene in which an AF frame freely moves in a screen like a case where the AF is performed while tracking a detected face or an object other than the face, video signals are obtained for an entire screen so that the focus lens 105 reaches the target position. Therefore, the in-focus performance of the AF is not degraded depending on the position of the AF frame. On the other hand, when the in-focus direction only has to be detected instead of the in-focus position, like a case where the image is blurred, the vertical synchronizing signals four times (4V) are required for one reciprocation in the minute drive.

Subsequently, referring to FIG. 9B, the 2V modulation operation will be described. In FIG. 9B, symbols $EV_A$, $EV_B$, and $EV_C$ are focus signals with respect to video signals with labels A, B, and C, respectively. The focus signals $EV_A$, $EV_B$, and $EV_C$ are incorporated into the camera/AF microcomputer 114 at the timing of times $T_A$, $T_B$, and $T_C$, respectively. At a time $T_B$, the level of the focus signal $EV_A$ is compared with the level of the focus signal $EV_B$, and the center of oscillation moves only when the level of the focus signal $EV_A$ is greater than the level of the focus signal $EV_B$. In other words, when a level of a latest focus signal is less than a level of a previous focus signal, the center of the oscillation moves. Similarly to the case of 4V modulation, the movement of the focus lens 105 is set based on a depth of focus and it is set to a moving amount that cannot be recognized on the screen.

In the 2V modulation operation, it seems that comparing the focus signal $EV_B$ with the focus signal $EV_C$ at the time $T_C$ is more appropriate than determining whether the oscillation center is to be moved at the time $T_B$. However, in the 2V modulation, the timing of driving the focus lens 105 needs to be expedited at the timing (i.e., at a maximum of the same timing as the vertical synchronizing signal where the readout of the label D starts) before the time $T_C$ in FIG. 9B with increasing the drive amplification. This will be described below referring to FIGS. 10A to 10D. Accordingly, in the 2V modulation, whether the target position is to be set to the position a) or the position b) needs to be determined at the timing of the time $T_B$. As described above, when the in-focus direction only has to be detected, like a case where the image is blurred, the vertical synchronizing signals twice (2V) are required for one period of the minute drive, and accordingly it is possible to perform the direction determination in half the time in the 4V modulation.

On the other hand, in the 2V modulation, when the focus lens reciprocates in the predetermined same area (within the range of the predetermined width) in the almost in-focus state, the width of the reciprocation increases compared to that in the 4V modulation, and accordingly, in the 2V modulation, the predetermined width to be determined as the same area is set to a width wider than that in the 4V modulation. This is because as a focus signal to be compared, a previous signal is used compared to the signal in the 4V modulation. As a result, in the 2V modulation, the timing where it can be determined that the position is away from the in-focus position is delayed by a center movement compared to the 4V modulation, and thus the center movements in a direction away from the in-focus position occur one more than the 4V modulation. Since the focus lens moves in both directions of the close-range direction and the infinite direction centered at the in-focus position during the reciprocation in the same area, the "predetermined width" can be calculated by expression (1) below.

$$\begin{aligned}\text{PREDETERMINED WIDTH IN 2V}\\\text{MODULATION}=\text{WIDTH IN 4V MODULATION}+2\times\text{AMOUNT OF CENTER MOVING}\\\text{AMOUNT}+\alpha\end{aligned} \quad (1)$$

In the 2V modulation, a focus evaluation value of the video signal accumulated during the drive of the focus lens 105 is used, and thus the performance of detecting the in-focus position may be potentially deteriorated compared to the 4V modulation, and accordingly, a value of α may be set as a margin.

As described above, the period where the camera/AF microcomputer 114 obtains the focus signal and the timing and the period where it sets the target position are changed between the 4V modulation and the 2V modulation. In addition, the relation of the levels of focus signals when the "latest focus signal" is compared with the "previous focus signal" is opposite between the 4V modulation and the 2V modulation. However, in a predetermined period of time immediately after the switch between the 4V modulation and the 2V modulation, the timing and the period for obtaining the focus signal and the comparing method in the modulation before the switch needs to be continued. In other words, in the 2V (including the switching time) immediately after the switch from the 4V modulation to the 2V modulation, a focus signal in the process of driving the focus lens 105 to a next target position during the 4V modulation immediately before the switch is not obtained. With respect to the comparing method of the focus signals, similarly to the case of 4V modulation, it is determined whether "the latest focus signal>the previous focus signal" is satisfied.

On the other hand, in 3V (including the switching time) immediately after switching from the 2V modulation to the 4V modulation, the focus signal in the 2V modulation immediately before the switch is obtained for each V. With respect to the comparing method of the focus signal, similarly to the case of the 2V modulation, it is determined whether "the latest focus signal<the previous focus signal" is satisfied.

Hereinafter, the period of time that predetermined processing of the modulation operation before the switch as described above continues is defined as a "transition period", and the determination of "vertical synchronizing signals twice" or "vertical synchronizing signals three times" is performed by setting a "transition period counter" and then counting it down.

<Minute Drive Period Determination Processing>

Figure 3:
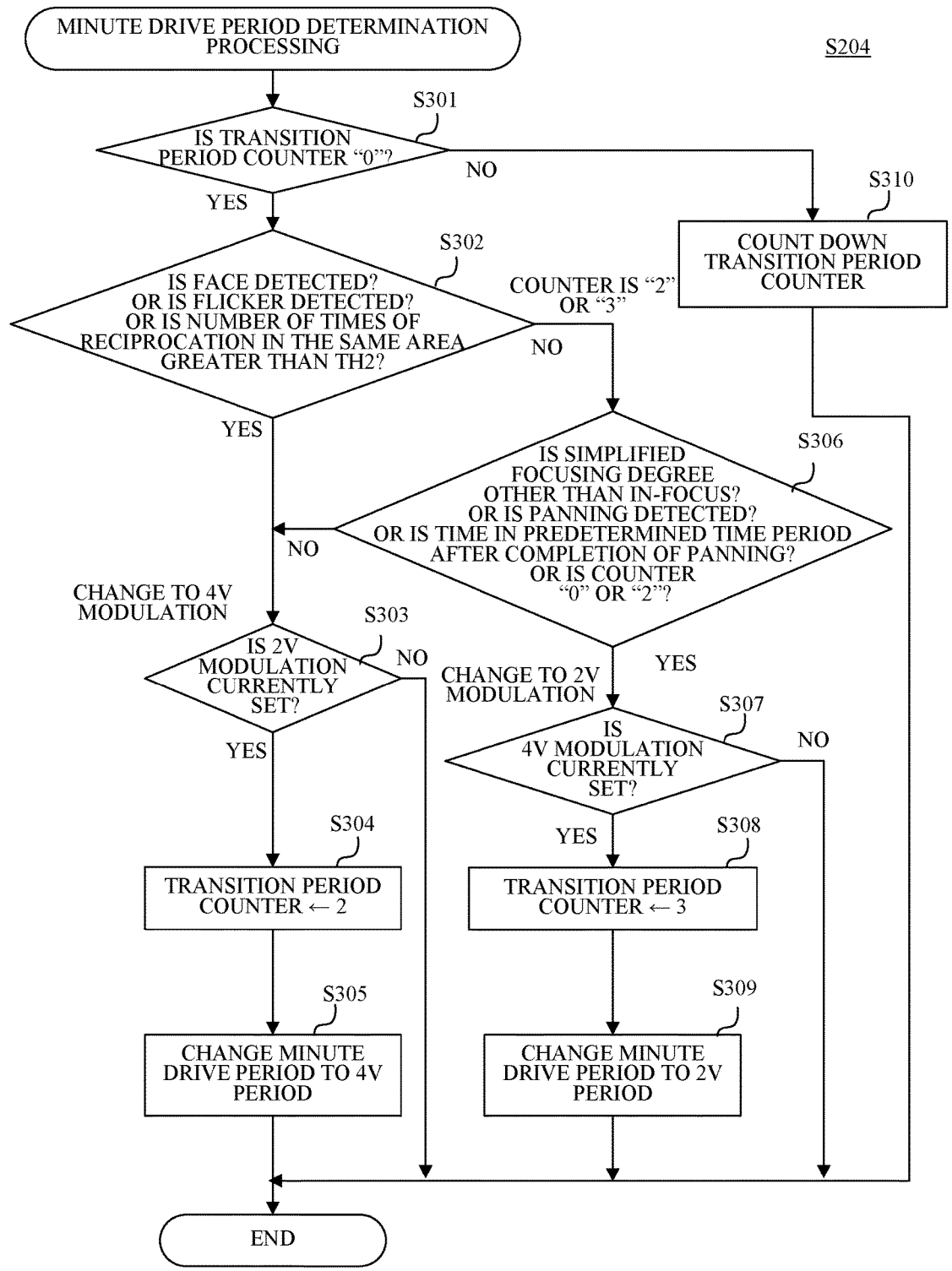
FIG. 3 is a flowchart of illustrating minute drive period determination processing in this embodiment.

Next, referring to FIG. 3, the minute drive period determination processing that is performed at step S204 in FIG. 2A will be described. FIG. 3 is a flowchart of illustrating the minute drive period determination processing. Each step of FIG. 3 is performed mainly by an instruction of the camera/AF microcomputer 114. The minute drive period determination processing is processing of determining whether the minute drive is set to the minute drive with the 4V period (4V modulation) or the minute drive with the 2V period (2V modulation).

First, at step S301, the camera/AF microcomputer 114 determines whether the transition period counter indicates "0". When the transition period counter indicates "0", the flow proceeds to step S302. On the other hand, when the transition period counter indicates other than "0", the flow proceeds to step S310.

At step S302, the camera/AF microcomputer 114 determines whether a face detection result is output from the face detection processing circuit 113, whether a flicker is detected, or whether the number of times of reciprocation in the same area exceeds a threshold value TH2. When at least one of the conditions described above is satisfied, the flow proceeds to step S303. On the other hand, when all the conditions are not satisfied, the flow proceeds to step S306. In this embodiment, the threshold value TH2 is set to a value smaller than the threshold value TH1 that is used for the in-focus determination. While the three conditions are used as conditions at step S302 in this embodiment, it is not limited thereto and a part of the conditions can be arbitrarily removed, changed, or added.

At step S303, the camera/AF microcomputer 114 determines whether the 2V modulation is currently set. When the 2V modulation is currently set, the flow proceeds to step S304. At step S304, the camera/AF microcomputer 114 sets the transition period counter to "2" in order to determine the transition period described above when changing the 2V modulation to the 4V modulation. Subsequently, at step S305, the camera/AF microcomputer 114 changes the minute drive period to the 4V period and then it finishes the minute drive period determination processing. When the 2V modulation is being changed to the 4V modulation, a counter indicating an operation state of the minute drive described below is set to start at "0" or "2".

Here, a reason why it starts at the timing of accumulating charges in the image sensor 106 (i.e., a reason why the counter indicating the operation state of the minute drive starts at "0" or "2") will be described. As described referring to FIGS. 9A and 9B, in the 2V modulation, whether the target position is set to a) or b) in FIG. 9B needs to be determined at the timing of the time $T_B$ (i.e., timing of the vertical synchronizing signal before driving the focus lens 105). On the other hand, in the 4V modulation, whether the target position is set to a) or b) in FIG. 9A is determined at the timing of the time $T_F$ (i.e., timing of the same vertical synchronizing signal as that of driving the focus lens 105). If the counter indicating the operation state of the minute drive starts at "1" or "3" in changing the 2V modulation to the 4V modulation, the target position determined in the 2V modulation is reset at the timing of being switched to the 4V modulation. Accordingly, there is a possibility that the focus lens 105 does not reach the target position determined in the 2V modulation at the timing of the switch of the modulation operation. Alternatively, even if the focus lens 105 reaches the target position determined in the 2V modulation, it is immediately driven toward the target position determined in the 4V modulation. As a result, the charges cannot be accumulated in the image sensor 106 at the target position determined in the 2V modulation, and a desired focus evaluation value cannot be acquired. Accordingly, when the 2V modulation is being changed to the 4V modulation, the counter indicating the operation state of the minute drive needs to be set to start at "0" or "2".

At step S306 in FIG. 3, it is determined whether a simplified focusing degree described below is other than "in-focus", whether the panning is detected, whether it is in a predetermined period of time after the completion of the panning, or whether the counter indicating the operation state of the minute drive is set to "0" or "2". This operation is performed by the camera/AF microcomputer 114 and the state detection circuit 117 (panning detector). When the panning is detected by the state detection circuit 117, the camera/AF microcomputer 114 sets the minute drive period to the 2V period (second period) during the detection of the panning and until the passage of the predetermined period of time after the panning is not detected.

When at least one of the conditions described above is satisfied, the condition required for performing the 2V modulation is satisfied, and accordingly the flow proceeds to step S307. On the other hand, when all the conditions described above are not satisfied, the flow proceeds to step S303. The reasons why it is determined whether the counter indicating the operation state of the minute drive is "0" or "2" at step S306 is that the focus signals are inconsistent if the 4V modulation is changed to the 2V modulation at the timing where the counter indicates "1" or "3". For example, a case where the 4V modulation is changed to the 2V modulation at the timing where the counter indicates "1" will be considered. First, when the counter indicates "0" in the 4V modulation, the focus signal at an infinite side is stored at step S603 described below. When the 4V modulation is switched to the 2V modulation at the next timing (counter indicates "1"), the focus signal obtained at the timing of the drive of the lens in the 4V modulation is to be stored again as a focus signal at the infinite side at step S704 described below. Accordingly, in this embodiment, it is determined whether the counter indicating the operation state of the minute drive is "0" or "2". While the four conditions are used as conditions at step S306 in this embodiment, it is not limited thereto, and a part of the conditions can be arbitrarily removed, changed, or added.

Figure 4:
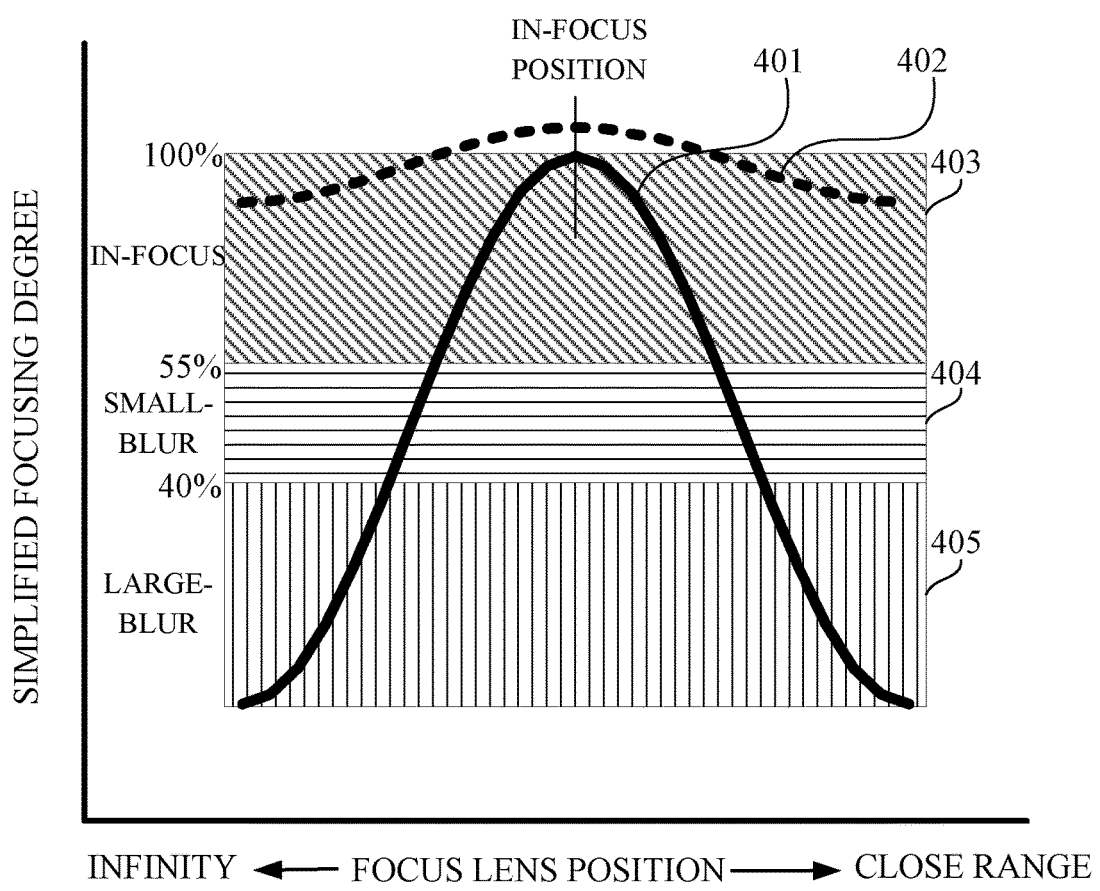
FIG. 4 is an explanatory diagram of a simplified focusing degree in this embodiment.

Referring to FIG. 4, the simplified focusing degree will be described. FIG. 4 is an explanatory diagram of the simplified focusing degree, and it illustrates a change of the focus signal at each focus lens position with respect to a predetermined object.

The focus signal indicated by a solid line 401 increases as the focus lens position approaches the in-focus position, and conversely it decreases as the focus lens position is away from the in-focus position. In this embodiment, the video signal passes through a high-frequency filter where a high-frequency component with a frequency higher than or equal to a predetermined cutoff frequency, and the focus signal is a value (TEP) based on the passed high-frequency component. Areas 403 to 405 are conceptual areas that represent degrees of focusing (in-focus, small-blur, or large-blur) called simplified focusing degrees. The simplified focusing degree is calculated as a value dividing the value TEP described above by "a maximum value (MMP) of a difference between a maximum value and a minimum value of the contrast".

In FIG. 4, a change of the MMP depending on the focus lens position is indicated by a dotted line 402. Compared to the focus signal indicated by the solid line 401, the dotted line 402 indicates a small amount of increase and decrease depending on the focus lens position. Each of the maximum value and the minimum value of the contrast is approximately constant independently of a blur state as long as an object is identical, and thus a variation of the focus signal depending on the object can be suppressed to some extent. Accordingly, in this embodiment, it is determined that the focus state is the "in-focus" when the simplified focusing degree (TEP/MMP) is more than or equal to 55%, the focus state is the "small-blur" when it is more than or equal to 40% and less than 55%, and the focus state is the "large-blur" when it is less than 40%. However, the rate (i.e., the simplified focusing degree relating to a boundary of the in-focus, the small-blur, and the large-blur) is not limited thereto, and it can be changed as appropriate.

At step S307 in FIG. 3, the camera/AF microcomputer 114 determines whether the 4V modulation is currently set. When the 4V modulation is currently set, the flow proceeds to step S308, and the camera/AF microcomputer 114 sets the transition period counter that determines the transition period when changing the 4V modulation to the 2V modulation to "3". On the other hand, when the 2V modulation is currently set, the minute drive period determination processing is finished while the 2V modulation is set. After setting the transition period counter to "3" at step S308, the flow proceeds to step S309. At step S309, the minute drive period is changed to the 2V period, and then the minute drive period determination processing is finished.

At step S310, the camera/AF microcomputer 114 counts the transition period counter down, and it finishes the minute drive period determination processing. Thus, in this embodiment, when the transition period counter is not "0", the determination of the minute drive period is not performed and instead the countdown of the transition period counter is only performed. As a result, the change of the 4V modulation and the 2V modulation for each V is avoided, and the complication of the timing of obtaining the focus signal or the timing of setting the drive target position can be prevented.

According to the processing described above, the determination of the switch of the 4V modulation operation and the 2V modulation operation is performed, and thus it is possible to perform control of the direction determination operation in a short time when the object is blurred and the detection of an accurate in-focus position near the in-focus state (in the almost in-focus state) at the same time.

<BPF Band Determination Processing>

Figure 11A:
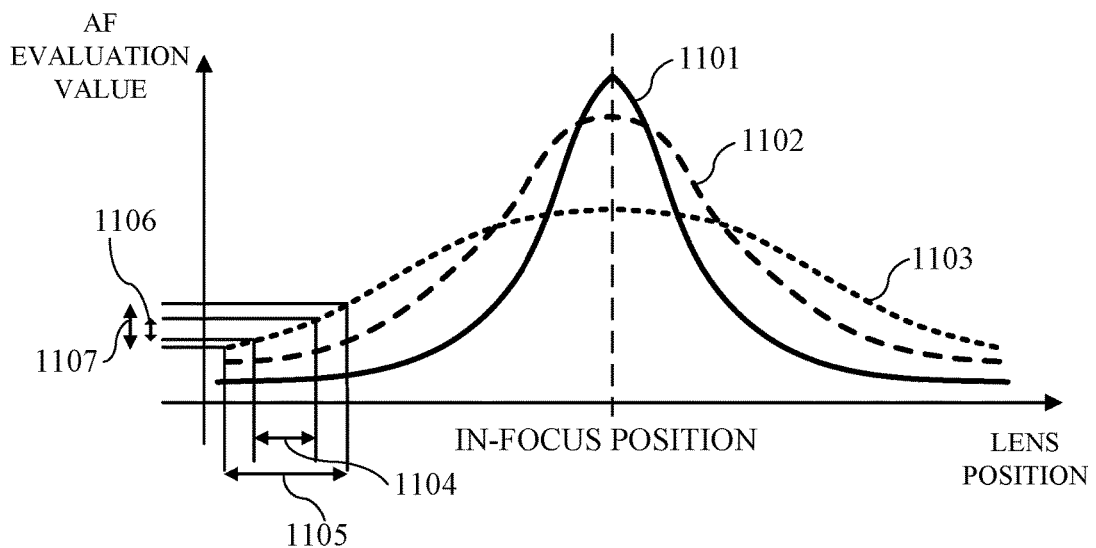
FIGS. 11A and 11B are explanatory diagrams of defocus characteristics of a focus signal in this embodiment.
Figure 11B:
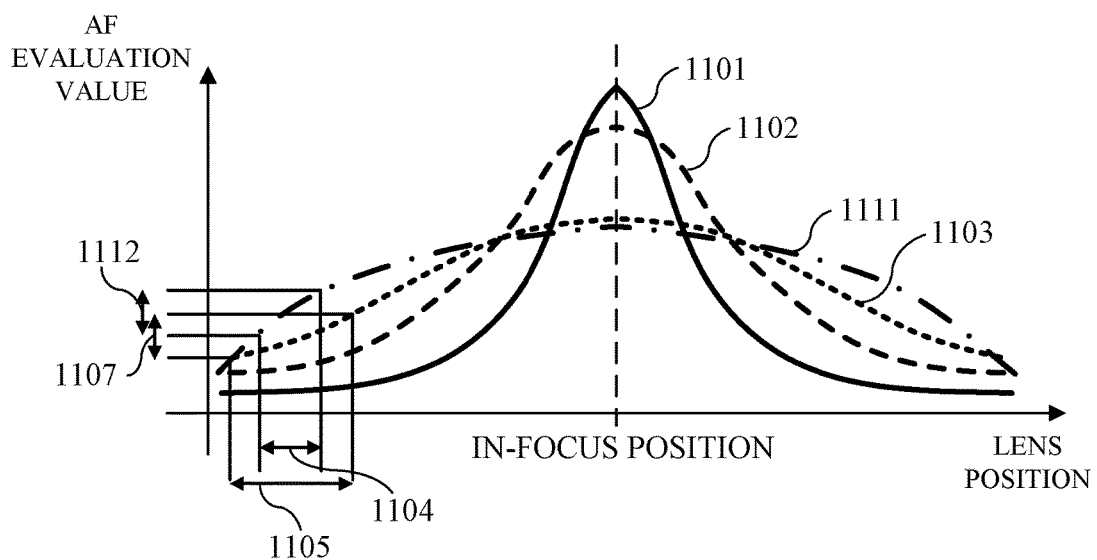

Next, referring to FIGS. 11A and 11B, defocus characteristics of the focus signal will be described. FIGS. 11A and 11B are explanatory diagrams of the defocus characteristics of the focus signal. FIG. 11A is a diagram of illustrating an example of the focus signal with respect to a position of the focus lens 105.

When an object is captured, an AF evaluation value increases with focusing as illustrated in FIG. 11A, and a point where the AF evaluation value (level) is maximized is the in-focus position. Such defocus characteristics have a steep mountain shape around the in-focus position with increasing the center frequency of a band-pass filter (BPF) with respect to a band of a video signal, and on the other hand, the characteristics have a gentle mountain shape around the in-focus position with decreasing the center frequency. In the defocus characteristics, an inclination of at the foot of the mountain is emphasized (the inclination increases) as the center frequency of the BPF is lowered. In this embodiment, as illustrated in FIG. 11A, focus signals 1101, 1102, and 1103 with three bands will be considered.

In FIG. 11A, it is assumed that reference numeral 1105 denotes an amplitude of the minute drive during the large-blur state in a first mode, a variation 1107 is obtained with respect to the low-band focus signal 1103 (AF evaluation value) that is most effective during the large-blur state. Here, a case where the mode of the camera is changed to a second mode whose depth of focus is shallower than that in the first mode will be considered. Hereinafter, it is assumed that the depth of focus in the second mode is around a half of the depth of focus in the first mode. Since the depth of focus in the second mode is a half of the depth of focus in the first mode, the amplitude of the minute drive also needs to be halved in order to make the movement of a focal plane unrecognizable. In this case, as indicated by a variation 1106 of the low-band focus signal 1103 (AF evaluation value), the direction determination performance is reduced. For example, when the ideal mountain shape is depicted as illustrated in FIG. 11A, the direction determination performance is not easily reduced, but in reality, there is a high possibility that a correct direction cannot be determined due to an influence of a noise component or a blur of the video. In this embodiment, the band-pass filter (BPF) of the focus signal 1103 with a lowest band (low band, or first frequency band) among the focus signals 1101, 1102, and 1103 with the three bands described above is set to lower band (ultralow band, or second frequency band). As a result, a variation of the focus signal which is the same as that in the first mode can be obtained even when it has a small amplitude.

In FIG. 11B, an example of the defocus characteristics when the band-pass filter is set to the ultralow band is indicated by a focus signal 1111. With respect to the focus signal 1111, although the steepness of the mountain shape around the in-focus state decreases, the inclination at the foot of the mountain increases. Comparing a difference 1107 of the low-band focus signals 1103 obtained by an amplitude 1105 during the first mode with a difference 1112 of the ultralow-band focus signal 1111 obtained by an amplitude 1104 during the second mode, it can be understood that approximately the same variation is obtained.

As described above, the direction determination performance is improved by switching the band to the ultralow band where the inclination at the foot of the mountain is clarified in the large-blur state or the like. The change of the BPF band described above is performed on the same condition as the condition where the period of the minute drive is switched to the 2V period in that the simplified focusing degree is other than the "in-focus". This relates to acquisition of the focus evaluation value in the process of driving the focus lens 105. In other words, the video signal in the process of driving the focus lens 105 increases in low-band component of the focus signal due to the drive blur of the focus lens 105, compared with the case where the focus lens 105 is stopped. Accordingly, a situation where the determination is performed in the ultralow band more easily is achieved.

<BPF Band Determination Processing>

Figure 5:
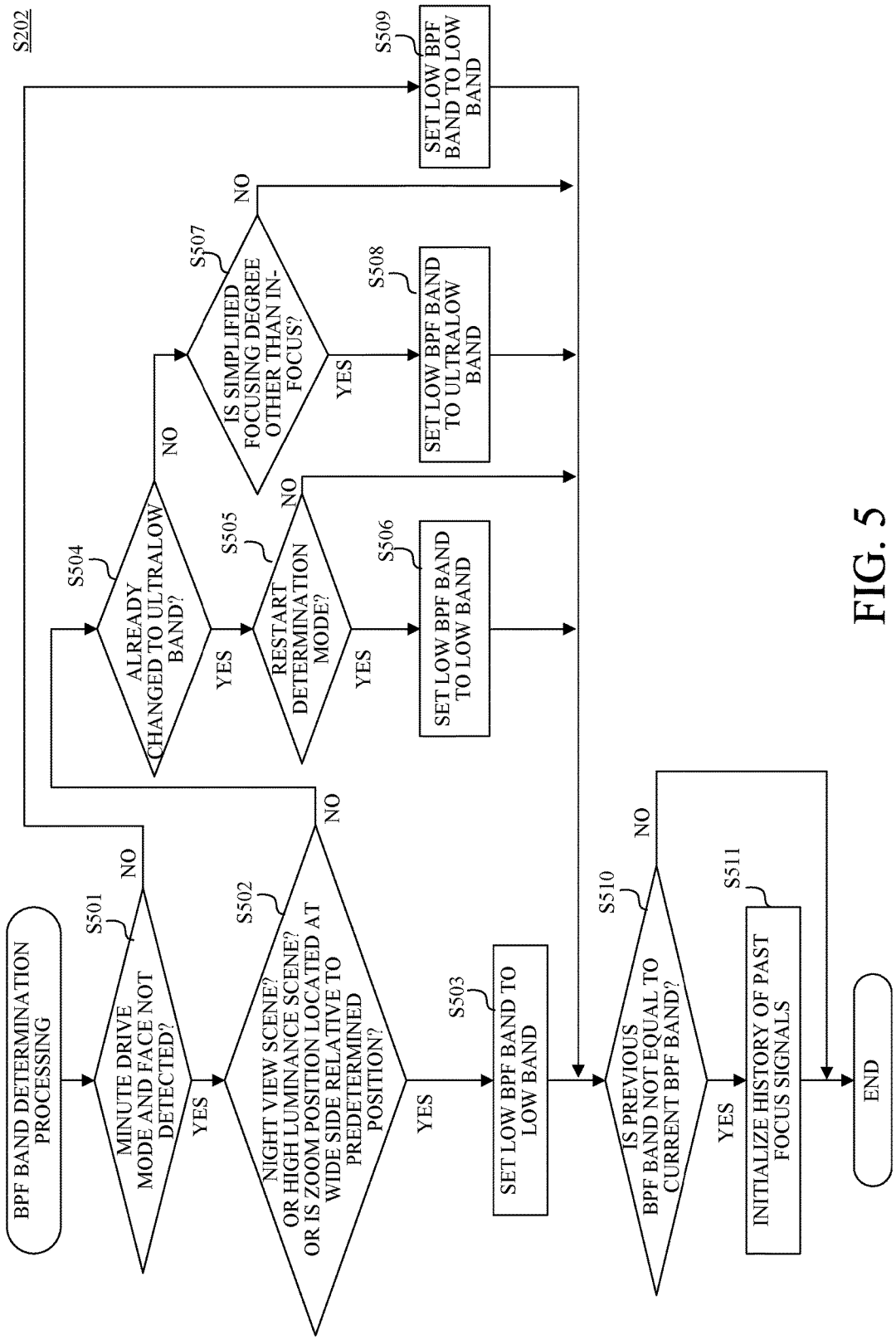
FIG. 5 is a flowchart of illustrating BPF band determination processing in this embodiment.

Next, referring to FIG. 5, the BPF band determination processing (step S202 in FIG. 2A) based on the defocus characteristics will be described. FIG. 5 is a flowchart of illustrating the BPF band determination processing. Each step of FIG. 5 is performed mainly based on an instruction of the camera/AF microcomputer 114.

First, at step S501, the camera/AF microcomputer 114 determines whether the current drive mode is the minute drive mode and any face is not detected by the face detection processing circuit 113. When both the conditions described above are satisfied, the flow proceeds to step S502. On the other hand, when at least one of the conditions is not satisfied, the flow proceeds to step S509.

The reason why the BPF band is returned to the low band when the drive mode is not the minute drive mode (i.e., in the climbing drive) is as follows. In other words, in the climbing drive, it is assumed that the focus lens 105 reaches the vicinity of the in-focus position. In the vicinity of the in-focus position, a determination of a night view scene is performed by using a low-band focus signal as well. Therefore, there is a possibility that the night view scene is erroneously determined if a state where the ultralow band is set is maintained. Accordingly, when the drive mode is changed to the climbing drive control, the BPF band is changed from the ultralow band to the low band.

The reason why the BPF band is returned to the low band when the face is being detected is that the state where the face is being detected can be determined as a state other than the large-blur state. In addition, when the face is detected, the minute drive is also changed to the 4V modulation, and accordingly the drive blur of the focus lens 105 does not occur and thus the low band is considered to be more appropriate than the ultralow band.

Subsequently, at step S502, the camera/AF microcomputer 114 determines whether a zoom position is located at a Wide side (wide-angle side) relative to a predetermined position, whether the scene is set to the night view scene, or whether the scene is set to a high luminance scene. Whether the scene is the night view scene or the high luminance scene can be determined based on the focus signal. When at least one of the conditions described above is satisfied, the flow proceeds to step S503. On the other hand, when all the conditions are not satisfied, the flow proceeds to step S504. The reason why the BPF band is not changed to the ultralow band when the zoom position is located at the Wide side relative to the predetermined position is as follows. In other words, when the zoom position is around the Wide side, a lot of objects exist in a screen (image), and thus a lot of relatively high frequency components tend to be included. Furthermore, a depth of field is also deep and a blur amount is relatively small, and accordingly advantageous effects caused by the change of the BPF band to the ultralow band are not easily achieved.

At step S503, the camera/AF microcomputer 114 sets, to the low band (first frequency band), the low BPF band among the three BPF bands (high band, middle band, and low band) with respect to the focus signal processing circuit 112, and then the flow proceeds to step S510.

At step S504, when the camera/AF microcomputer 114 already sets, to the ultralow band (second frequency band), the low BPF band among the three BPF bands with respect to the focus signal processing circuit 112, the flow proceeds to step S505. On the other hand, when it does not set the low BPF band to the ultralow band, the flow proceeds to step S507.

At step S505, the camera/AF microcomputer 114 determines whether the mode is changed to the restart determination mode in the TV-AF control of FIG. 2A. When the mode is changed to the restart determination mode, the flow proceeds to step S506. On the other hand, when the mode is not changed to the restart determination mode, the flow proceeds to step S510. In this embodiment, the reason why the BPF band is not returned from the ultralow band to the low band until the change to the restart determination mode is as follows. In other words, if the frequency band is changed during the minute drive, it takes a time to output the focus signal with the changed band. Furthermore, the direction determination cannot be performed until the output of the focus signals with the changed band twice, and accordingly the movement of the drive center cannot be tentatively performed and thus there is a possibility that the time required for achieving the in-focus state is extended.

At step S506, the camera/AF microcomputer 114 sets, to the low band, the low BPF band among the three BPF bands (high band, middle band, and low band) with respect to the focus signal processing circuit 112, and then the flow proceeds to step S510.

At step S507, the camera/AF microcomputer 114 calculates the simplified focusing degree based on the focus signal acquired at step S201, and it determines whether the simplified focusing degree is other than the "in-focus". When the simplified focusing degree is other than the "in-focus", the flow proceeds to step S508. At step S508, the camera/AF microcomputer 114 sets, to the ultralow band (second frequency band), the low BPF band among the three BPF bands (high band, middle band, and low band) with respect to the focus signal processing circuit 112. On the other hand, when the simplified focusing degree is the "in-focus", the flow proceeds to step S510.

At step S509, the camera/AF microcomputer 114 sets, to the low band (first frequency band), the low BPF band among the three BPF bands (high band, middle band, and low band) with respect to the focus signal processing circuit 112, and then the flow proceeds to step S510.

At step S510, the camera/AF microcomputer 114 determines whether the BPF band set at step S503, S506, S508, or S509 is a different band from the previously set BPF band. When the band is different, the flow proceeds to step S511. On the other hand, when the band is the same, the BPF band determination processing is finished.

At step S511, the camera/AF microcomputer 114 initializes a history of past focus signals, and then it finishes the BPF band determination processing. The reason why the history of the past focus signals is initialized is that the frequency band of the subsequently output focus signals is changed when the frequency band is switched, and as a result the comparison and the determination using the past focus evaluation value cannot be performed in the minute drive processing.

As described above, the focus signal processing circuit 112 generates the plurality of focus signals that correspond to the respective components of the plurality of frequency bands (BPF bands of high band, middle band, and low band). When the predetermined condition described above is satisfied, the controller changes the component of the lowest frequency band (low BPF band) among the plurality of frequency bands to the second frequency band (ultralow band).

<Detail Flow of 4V Modulation>

Figure 6A:
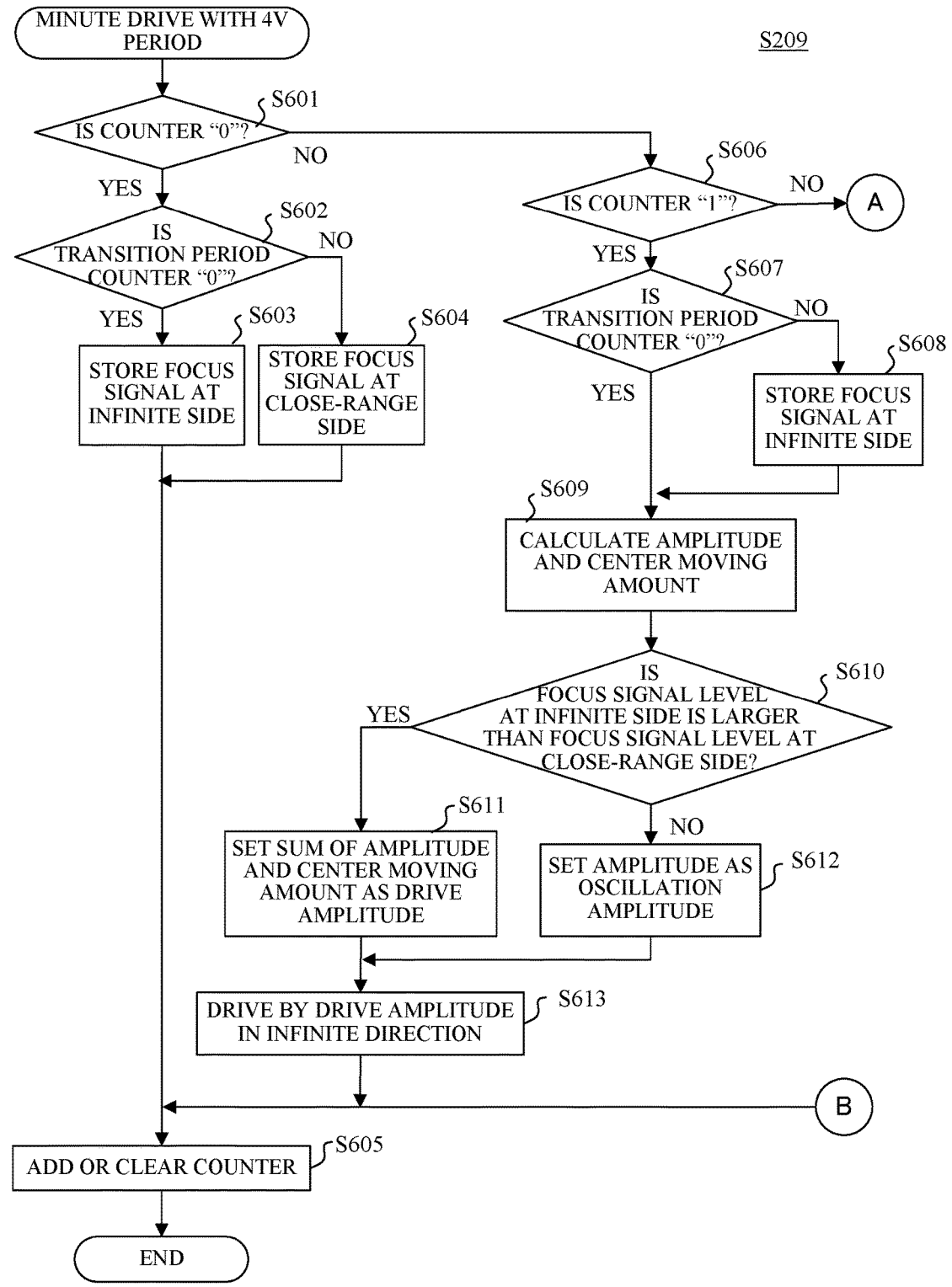
FIGS. 6A and 6B are flowcharts of illustrating minute drive with a 4V period in this embodiment.
Figure 6B:
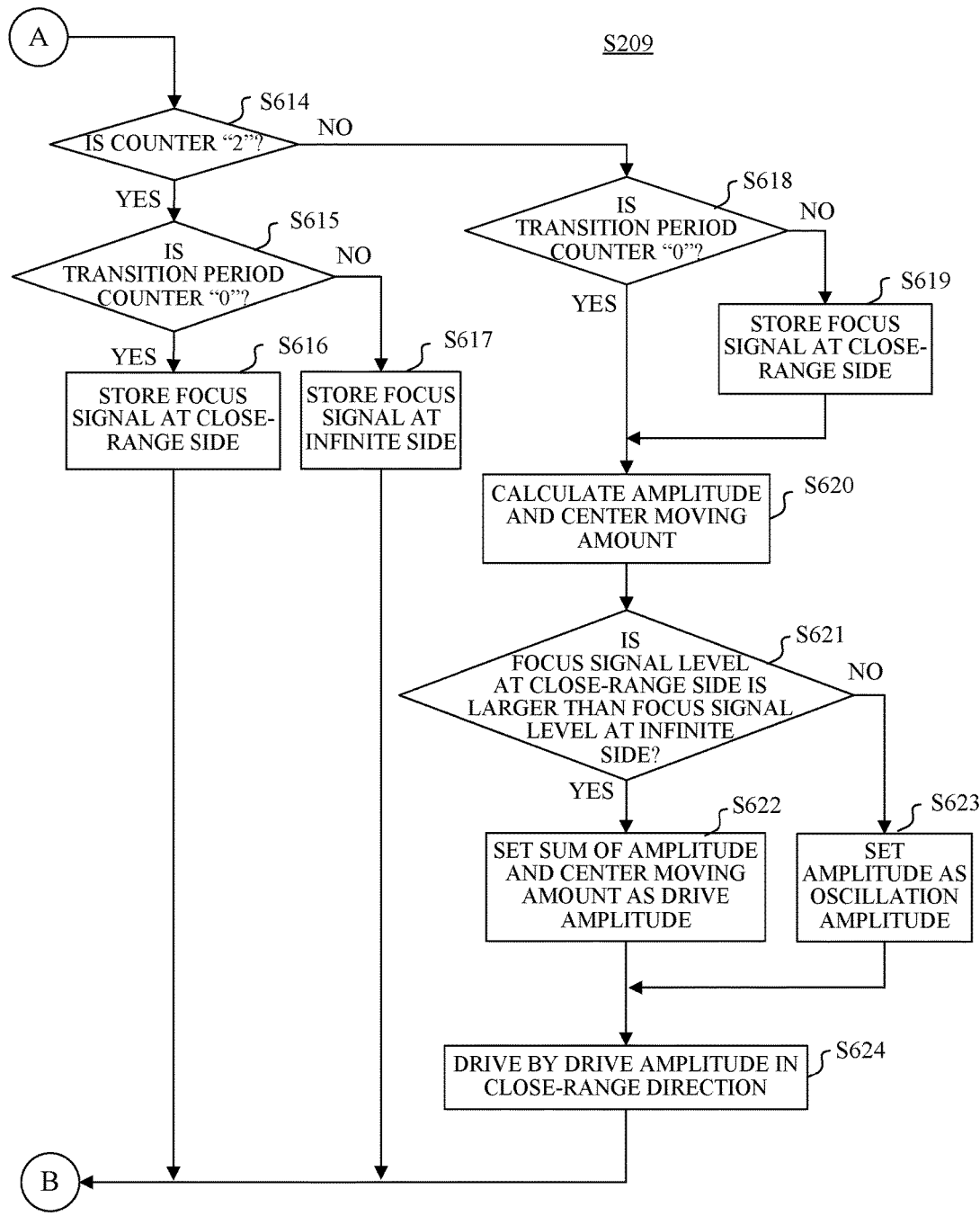

Next, referring to FIGS. 6A and 6B, the minute drive with the 4V period in the TV-AF control (step S209 in FIG. 2A) will be described. FIGS. 6A and 6B are flowcharts of illustrating the minute drive with the 4V period. Each step of FIGS. 6A and 6B is performed mainly based on an instruction of the camera/AF microcomputer 114.

First, at step S601, the camera/AF microcomputer 114 determines whether the counter indicating the operation state of the minute drive is currently set to "0". When the current counter is "0", the flow proceeds to step S602. On the other hand, when the counter is not "0", the flow proceeds to step S606.

At step S602, the camera/AF microcomputer 114 determines whether the transition period counter is "0". When the transition period counter is "0", the flow proceeds to step S603. On the other hand, when the transition period counter is not "0", the flow proceeds to step S604.

At steps S603 and S604, the current level of the focus signal is stored as processing when the focus lens 105 is located at the infinite side or the close-range side. The focus signal acquired at step S603 is based on the video signal that is generated from charges accumulated in the image sensor 106 when the focus lens 105 is located at the infinite side at steps 616 or S607 described below. On the other hand, the focus signal acquired at step S604 is based on the video signal that is generated from charges accumulated in the image sensor 106 when the focus lens 105 is located at the close-range side at step S703 or S704 in the 2V modulation described below. Subsequently, at step S605, the camera/AF microcomputer 114 returns the counter indicating the operation state of the minute drive to "0" if the counter indicates "3", and it increments the counter if it indicates another value.

At step S606, the camera/AF microcomputer 114 determines whether the current counter is "1", and the flow proceeds to step S607 if so, and on the other hand the flow proceeds to step S614 if not. At step S607, the camera/AF microcomputer 114 determines whether the transition period counter is "0". When the transition period counter is "0", the flow proceeds to step S609. On the other hand, when the transition period counter is not "0", the flow proceeds to step S608.

At step S608, the camera/AF microcomputer 114 stores the current level of the focus signal. The focus signal acquired at step S608 is based on the video signal that is generated from charges accumulated in the image sensor 106 when the focus lens 105 is located at the infinite side or the close-range side at step S713 or S714 in the 2V modulation described below.

At step S609, the camera/AF microcomputer 114 calculates the oscillation amplitude and the center movement amplitude for driving the focus lens 105 at step S613 described below. Commonly, these amplitudes are set within a depth of focus. Subsequently, at step S610, when the transition period counter is "0", the camera/AF microcomputer 114 compares the focus signal level at the infinite side stored at step S603 with the focus signal level at the close-range side stored at step S616 described below. When the former is larger, the flow proceeds to step S611. On the other hand, when the latter is larger, the flow proceeds to step S612.

On the other hand, when the transition period counter is not "0", the camera/AF microcomputer 114 compares the focus signal level at the infinite side stored at step S608 with the focus signal level at the close-range side stored at step S604 described above. When the former is larger, the flow proceeds to step S611. On the other hand, when the latter is larger, the flow proceeds to step S612. At step S611, the camera/AF microcomputer 114 adds the oscillation amplitude to the center movement amplitude to set the added amplitude as a drive amplitude. At step S612, the oscillation amplitude is set as a drive amplitude. Subsequently, at step S613, the camera/AF microcomputer 114 drives the focus lens 105 in the infinite direction based on the drive amplitude obtained at step S611 or step S612.

At step S614, the camera/AF microcomputer 114 determines whether the current counter is "2". When the counter is "2", the flow proceeds to step S615. On the other hand, when the counter is not "2", the flow proceeds to step S618.

At step S615, the camera/AF microcomputer 114 determines whether the transition period counter is "0". When the transition period counter is "0", the flow proceeds to step S616. On the other hand, when the transition period counter is not "0", the flow proceeds to step S617. At steps S616 and S617, the current level of the focus signal is stored as processing when the focus lens 105 is located at the close-range side or the infinite side. The focus signal acquired at step S616 is based on the video signal that is generated from charges accumulated in the image sensor 106 when the focus lens 105 is located at the infinite side or the close-range side at steps 603 or S604 described above. On the other hand, the focus signal acquired at step S617 is based on the video signal that is generated from charges accumulated in the image sensor 106 when the focus lens 105 is located at the infinite side or the close-range side at step S713 or S714 in the 2V modulation described below.

At step S618, the camera/AF microcomputer 114 determines whether the transition period counter is "0". When the transition period counter is "0", the flow proceeds to step S620. On the other hand, when the transition period counter is not "0", the flow proceeds to step S619. At step S619, the current level of the focus signal is stored. The focus signal acquired at step S619 is based on the video signal that is generated from charges accumulated in the image sensor 106 when the focus lens 105 is located at the close-range side or the infinite side at step S703 or S704 in the 2V modulation described below. At step S620, the camera/AF microcomputer 114 calculates the oscillation amplitude and the center movement amplitude for driving the focus lens 105 at step S624 described below. Commonly, these amplitudes are set within the depth of focus.

Subsequently, at step S621, when the transition period counter is "0", the camera/AF microcomputer 114 compares the focus signal level at the close-range side stored at step S616 with the focus signal level at the infinite side stored at step S603 described above. When the former is larger, the flow proceeds to step S622. On the other hand, when the latter is larger, the flow proceeds to step S623. On the other hand, when the transition period counter is not "0", the camera/AF microcomputer 114 compares the focus signal level at the close-range side stored at step S619 with the focus signal level at the infinite side stored at step S617 described above. When the former is larger, the flow proceeds to step S622. On the other hand, when the latter is larger, the flow proceeds to step S623.

At step S622, the camera/AF microcomputer 114 adds the oscillation amplitude to the center movement amplitude to set the added amplitude as a drive amplitude. At step S623, the camera/AF microcomputer 114 sets the oscillation amplitude as a drive amplitude. Subsequently, at step S624, the camera/AF microcomputer 114 drives the focus lens 105 in the infinite direction based on the drive amplitude obtained at step S622 or step S623.

<Detail Flow of 2V Modulation>

Figure 7:
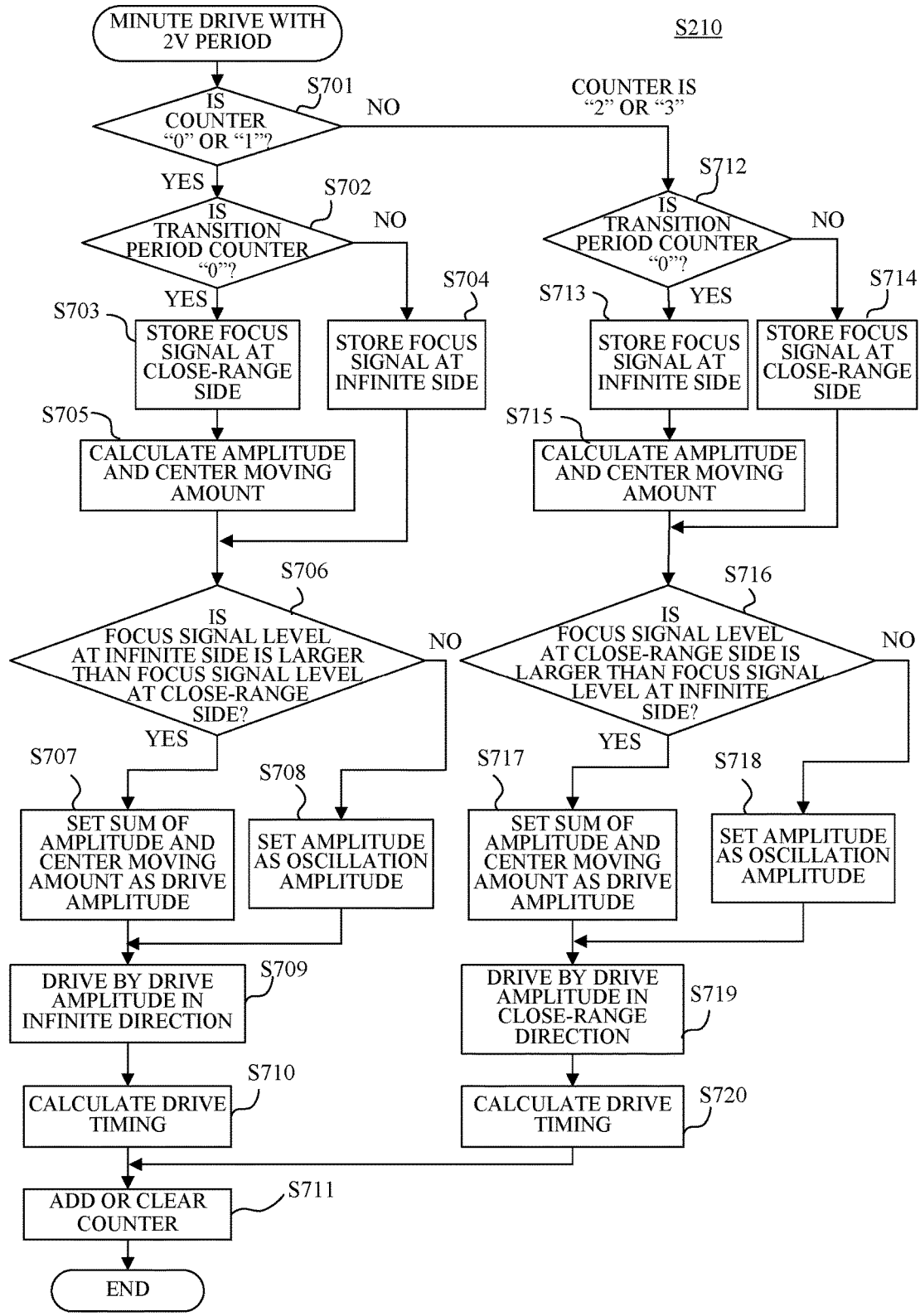
FIG. 7 is a flowchart of illustrating minute drive with a 2V period in this embodiment.

Next, referring to FIG. 7, the minute drive with the 2V period in the TV-AF control (step S210 in FIG. 2A) will be described. FIG. 7 is a flow chart of illustrating the minute drive with the 2V period. Each step of FIG. 7 is performed mainly based on an instruction of the camera/AF microcomputer 114.

First, at step S701, the camera/AF microcomputer 114 determines whether the counter indicating the operation state of the minute drive is currently set to "0" or "1". When the counter is "0" or "1", the flow proceeds to step S702. On the other hand, when the counter is not "0" or "1" (i.e., the counter is "2" or "3"), the flow proceeds to step S712.

At step S702, the camera/AF microcomputer 114 determines whether the transition period counter is "0". When the transition period counter is "0", the flow proceeds to step S703. On the other hand, when the transition period counter is not "0", the flow proceeds to step S704. At steps S703 and S704, the current level of the focus signal is stored as processing when the focus lens 105 is located at the close-range side or the infinite side. The focus signal acquired at step S703 is based on the video signal that is generated from charges accumulated in the image sensor 106 when the focus lens 105 is located at the close-range side at step S703 or S704 as a previous timing. On the other hand, the focus signal acquired at step S704 is based on the video signal that is generated from charges accumulated in the image sensor 106 when the focus lens 105 is located at the infinite side at step S616 or S617 in the 4V modulation described above.

At step S705, the camera/AF microcomputer 114 calculates the oscillation amplitude and the center movement amplitude for driving the focus lens 105 at step S709 described below. Commonly, these amplitudes are set within the depth of focus. Subsequently, at step S706, when the transition period counter is "0", the camera/AF microcomputer 114 compares the focus signal level at the close-range side stored at step S703 with the focus signal level at the infinite side stored at step S713 described below. When the focus signal level at the infinite side is larger than the focus signal level at the close-range side, the flow proceeds to step S707. On the other hand, when the focus signal level at the close-range side is larger than the focus signal level at the infinite side, the flow proceeds to step S708. On the other hand, when the transition period counter is not "0", the camera/AF microcomputer 114 compares the focus signal level at the infinite side stored at step S704 with the focus signal level at the close-range side stored at step S714 described below or stored at step S616 in the 4V modulation described above. When the focus signal level at the infinite side is larger than the focus signal level at the close-range side, the flow proceeds to step S707. On the other hand, when the focus signal level at the close-range side is larger than the focus signal level at the infinite side, the flow proceeds to step S708.

At step S707, the camera/AF microcomputer 114 adds the oscillation amplitude to the center movement amplitude to set the added amplitude as a drive amplitude. At step S708, the camera/AF microcomputer 114 sets the oscillation amplitude as a drive amplitude. Subsequently, at step S709, the camera/AF microcomputer 114 drives the focus lens 105 in the infinite direction based on the drive amplitude obtained at step S707 or step S708. Subsequently, at step S710, the camera/AF microcomputer 114 obtains a timing of starting the drive of the focus lens 105 to the drive target position set at step S709, and then, the flow proceeds to step S711. The timing of starting the drive (drive timing) of the focus lens 105 obtained at step S710 or step S720 will be described below.

At step S711, the camera/AF microcomputer 114 clears the counter. In other words, when the counter indicating the operation state of the minute drive is "0" or "1", the camera/AF microcomputer 114 sets the counter to "2". On the other hand, when the counter is "2" or "3", it sets the counter to "0".

At step S712, the camera/AF microcomputer 114 determines whether the transition period counter is "0". When the transition period counter is "0", the flow proceeds to step S713. On the other hand, when the transition period counter is not "0", the flow proceeds to step S714. At steps S713 and S714, the current level of the focus signal is stored as processing when the focus lens 105 is located at the infinite side or the close-range side. The focus signal acquired at step S713 is based on the video signal that is generated from charges accumulated in the image sensor 106 when the focus lens 105 is located at the infinite side at step S713 or S714 as a previous timing. On the other hand, the focus signal acquired at step S714 is based on the video signal that is generated from charges accumulated in the image sensor 106 when the focus lens 105 is located at the close-range side at step S603 or S604 in the 4V modulation described above.

At step S715, the camera/AF microcomputer 114 calculates the oscillation amplitude and the center movement amplitude for driving the focus lens 105 at step S719 described below. Commonly, these amplitudes are set within the depth of focus. Subsequently, at step S716, when the transition period counter is "0", the camera/AF microcomputer 114 compares the focus signal level at the infinite side stored at step S713 with the focus signal level at the close-range side stored at step S703 described above. When the focus signal level at the close-range side is larger than the focus signal level at the infinite side, the flow proceeds to step S717. On the other hand, when the focus signal level at the infinite side is larger than the focus signal level at the close-range side, the flow proceeds to step S718. On the other hand, when the transition period counter is not "0", the camera/AF microcomputer 114 compares the focus signal level at the close-range side stored at step S714 with the focus signal level at the infinite side stored at step S704 described above or stored at step S603 in the 4V modulation described above. When the focus signal level at the close-range side is larger than the focus signal level at the infinite side, the flow proceeds to step S717. On the other hand, when the focus signal level at the infinite side is larger than the focus signal level at the close-range side, the flow proceeds to step S718.

At step S717, the camera/AF microcomputer 114 adds the oscillation amplitude to the center movement amplitude to set the added amplitude as a drive amplitude. At step S718, the camera/AF microcomputer 114 sets the oscillation amplitude as a drive amplitude. Subsequently, at step S719, the camera/AF microcomputer 114 drives the focus lens 105 in the infinite direction based on the drive amplitude obtained at step S717 or step S718. Subsequently, at step S720, the camera/AF microcomputer 114 obtains a timing of starting the drive of the focus lens 105 to the drive target position set at step S719, and then, the flow proceeds to step S711.

<Calculation of Drive Timing of Focus Lens in 2V Modulation>

Next, referring to FIGS. 10A to 10D, the drive timing of the focus lens 105 in the 2V modulation that is calculated at steps S710 and S720 in FIG. 7 will be described. FIGS. 10A to 10D are explanatory diagrams of the drive timing of the focus lens 105 in this embodiment.

Figures 10A, 10B:
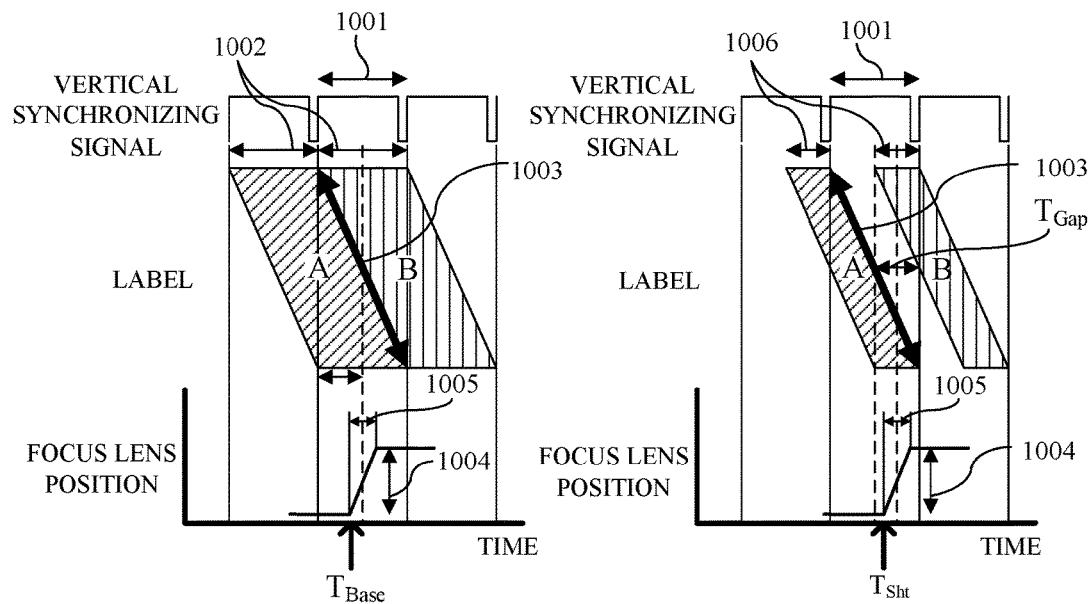
FIGS. 10A to 10D are explanatory diagrams of drive timings of the focus lens in this embodiment.

FIG. 10A illustrates a drive timing $T_{Base}$ of the focus lens from a predetermined vertical synchronizing signal to a next vertical synchronizing signal when the focus lens is operated in an accumulation time (shutter speed) of the video signal, a video readout time, and an amplitude as a base. The basic operation condition in FIG. 10A is assumed as follows.

In other words, a time interval 1001 between the predetermined vertical synchronizing signal to the next vertical synchronizing signal is 1/30 sec, a shutter speed 1002 is 1/30 sec, and a readout time 1003 of the video signal is 1/30 sec. A drive amplitude 1004 of the focus lens 105 is 10 μm, and a drive time 1005 required for moving the focus lens 105 by 10 μm is 4/600 sec. It is assumed that the camera/AF microcomputer 114 controls the focus lens 105 with a period of 20 times (1/600 sec) per 1/30 sec and that this period is a minimum unit time of the focus lens control.

In FIG. 10A, since both focus signals of the video signals for label A and label B in the 2V modulation are used, for example when the focus lens position during accumulating the video signal for the label A is located at the infinite side, the focus lens position during accumulating the video signal for the label B needs to be located at the close-range side. However, the focus lens cannot be stopped at the infinite-side position during an entire accumulation time period of the video signal for the label A. In the accumulation of the video signal for the label A, at least a half time of the shutter speed is controlled to perform accumulation at a lens position at the infinite side relative to the drive center, and thus it is possible to determine the in-focus direction.

Accordingly, when the focus lens 105 is to be driven, the focus lens 105 is controlled to pass through the drive center at the timing (i.e., timing of a half of the readout time 1003) where approximately a half of the readout of the video signal is completed. As a result, with respect to the accumulation of the video signals for the label A, for all lines, it is possible to perform the accumulation at the lens position at the infinite side relative to the drive center for a time not less than a half of the shutter speed.

Accordingly, the drive timing $T_{Base}$ of the focus lens 105 is calculated as follows. The camera/AF microcomputer 114 needs to control the focus lens 105 to pass through the oscillation center position after the passage of 1/60 sec from the vertical synchronizing signal. It takes 2/600 sec for the focus lens 105 to be driven at the oscillation center position, i.e., 5 μm as a half of the drive amplitude 1004, and therefore the focus lens 105 may be driven 2/600 sec earlier than the passage of 1/60 sec from the vertical synchronizing signal. Accordingly, "(1/60 sec)−(2/600 sec)=8/600 sec" is obtained and the drive timing $T_{Base}$ of the focus lens 105 is 8/600 sec later from the vertical synchronizing signal.

Next, FIG. 10B is an example where only the shutter speed is different compared to FIG. 10A, and a drive timing of the focus lens 105 in this case is indicated by $T_{Sht}$. A shutter speed 1006 illustrated in FIG. 10B is 1/60 sec.

In FIG. 10B, when the control is performed at the same timing as that in FIG. 10A, the accumulation time is shorter than that in FIG. 10A, and accordingly with respect to the video signal in a quarter area at the low side of the label A, the accumulation is performed at the lens position at the close-range side relative to the drive center for a time at least a half of the shutter speed. Accordingly, when the quarter area at the low side overlaps with an AF area, there is a high possibility that a desired focus signal is not output. To solve such a problem, when the accumulation time is 1/60 sec, the focus lens 105 is controlled to pass through the oscillation center at the timing where a half of a time $T_{Gap}$ from the completion of the readout for a center line of the video signal to the accumulation of the next video signal starts for the line passes. As a result, with respect to the accumulation of the video signals for the label A, for all lines, it is possible to perform the accumulation at the lens position at the infinite side relative to the oscillation center for a time not less than a half of the shutter speed.

Accordingly, the drive timing $T_{Sht}$ of the focus lens 105 is calculated as follows. The camera/AF microcomputer 114 needs to control the focus lens 105 to pass through the oscillation center position after the passage of 3/120 (1/60+1/120) sec from the vertical synchronizing signal. It takes 2/600 sec for the focus lens 105 to be driven at the oscillation center position, i.e., 5 μm as a half of the drive amplitude 1004, and therefore the focus lens 105 may be driven 2/600 sec earlier than the passage of 3/120 sec from the vertical synchronizing signal. Accordingly, "(3/120 sec)−(2/600 sec)=13/600 sec" is obtained and the drive timing $T_{Sht}$ of the focus lens 105 is 13/600 sec later from the vertical synchronizing signal. Thus, when the accumulation time of the video signal is shortened by 2/600 sec, the drive timing of the focus lens 105 is set to perform control to start movement 1/600 sec later than the drive timing $T_{Base}$.

Figures 10C, 10D:
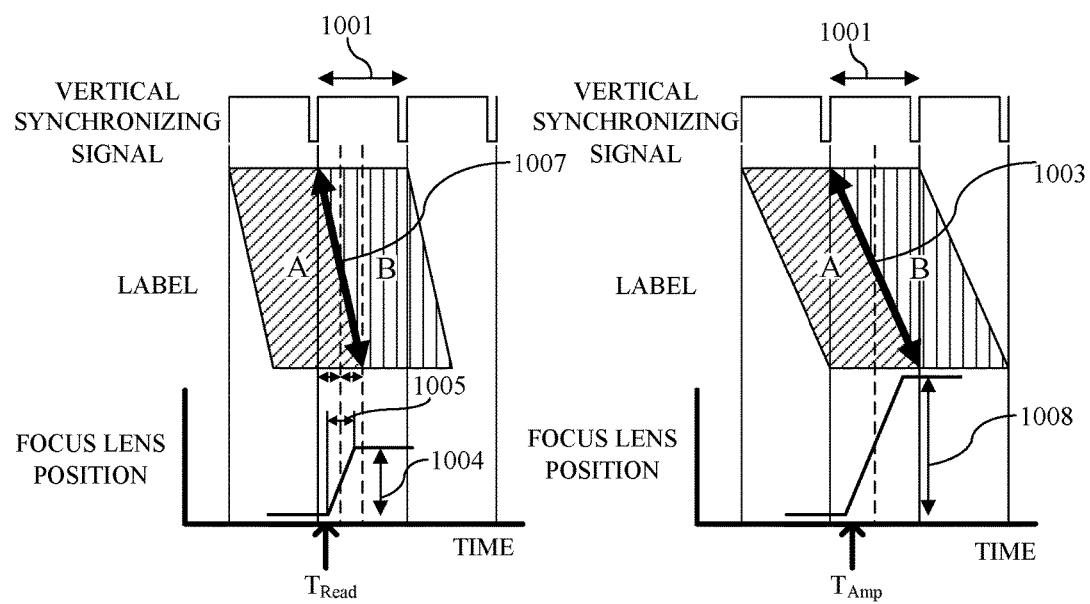

Next, FIG. 10C is an example where only the readout time of the video signal is different compared to FIG. 10A, and a drive timing of the focus lens 105 in this case is indicated by $T_{Read}$. A readout time 1007 illustrated in FIG. 10C is 1/60 sec.

Also in FIG. 10C, when the control is performed at the same timing as that in FIG. 10A, with respect to the video signal for the label B, there is no area where the accumulation is performed at the lens position at the infinite side relative to the drive center for at least a half of the time of the shutter speed. However, the accumulation is performed at the lens position at the close-range side as approaching the upper side of the video signal. Accordingly, the tendency of the focus signal is different between the upper side and the lower side of the AF area, and there is a high possibility that the correct in-focus direction cannot be easily determined. To solve such a problem, when the accumulation time is 1/60 sec, the focus lens 105 is controlled to pass through the oscillation center at the timing where the readout for the center line of the video signal is completed. As a result, the tendency of the focus signal between the upper side and the lower side of the video signal for the label B is eliminated, and the correct in-focus direction can be easily determined.

Accordingly, the drive timing $T_{Read}$ of the focus lens 105 is calculated as follows. The camera/AF microcomputer 114 needs to control the focus lens 105 to pass through the oscillation center position after the passage of 1/120 sec from the vertical synchronizing signal. It takes 2/600 sec for the focus lens 105 to be driven at the oscillation center position, i.e., 5 µm as a half of the drive amplitude 1004, and therefore the focus lens 105 may be driven 2/600 sec earlier than the passage of 1/120 sec from the vertical synchronizing signal. Accordingly, "(1/120 sec)−(2/600 sec)=3/600 sec" is obtained and the drive timing $T_{Read}$ of the focus lens 105 is 3/600 sec later from the vertical synchronizing signal. Thus, when the accumulation time of the video signal is shortened by 2/600 sec, the drive timing of the focus lens 105 is set to perform control to start movement 1/600 sec earlier than the drive timing $T_{Base}$.

Next, FIG. 10D is an example where only the drive amplitude of the focus lens 105 is different compared to FIG. 10A, and a drive timing of the focus lens 105 in this case is indicated by $T_{Amp}$. A drive amplitude 1008 of the focus lens 105 illustrated in FIG. 10D is 20 µm, which is twice of the drive amplitude 1004.

Also in FIG. 10D, when the control is performed at the same timing as that in FIG. 10A, the drive amplitude is large, and therefore, with respect to the upper side of the video signal for the label B, the accumulation is performed at the lens position at the infinite side relative to the oscillation center for at least a half of the time of the shutter speed. Accordingly, the area at the upper side overlaps with the AF area, there is a high possibility that a desired focus signal is not output. To solve such a problem, when the drive amplitude 1008 of the focus lens 105 is 20 µm, the focus lens 105 is controlled to pass through the oscillation center at the timing where approximately a half of the readout for the video signal or the AF area is completed. As a result, with respect to the accumulation of the video signals for the label B, for all lines, it is possible to perform the accumulation at the lens position at the close-range side relative to the oscillation center for a time not less than a half of the shutter speed.

Accordingly, the drive timing $T_{Amp}$ of the focus lens 105 is calculated as follows. The camera/AF microcomputer 114 needs to control the focus lens 105 to pass through the oscillation center position of the drive amplitude 1008 after the passage of 1/60 sec from the vertical synchronizing signal. It takes 4/600 sec for the focus lens 105 to be driven at the oscillation center position, i.e., 10 µm as a half of the drive amplitude 1008, and therefore the focus lens 105 may be driven 4/600 sec earlier than the passage of 1/60 sec from the vertical synchronizing signal. Accordingly, "(1/60 sec)−(4/600 sec)=6/600 sec" is obtained and the drive timing $T_{Amp}$ of the focus lens 105 is 6/600 sec later from the vertical synchronizing signal. Thus, when the drive amplitude of the focus lens 105 increases by an amount for performing the drive in 2/600 sec, the drive timing of the focus lens 105 is set to perform control to start movement 1/600 sec earlier than the drive timing $T_{Base}$.

As described above, preferably, when the minute drive period (reciprocation period) is the second period (2V period), the camera/AF microcomputer 114 changes the drive timing of the focus lens depending on at least one of a readout time of the image signal, a charge accumulation time of the image signal, and a drive amount of the focus lens.

<Climbing Drive Control>

Figure 8:
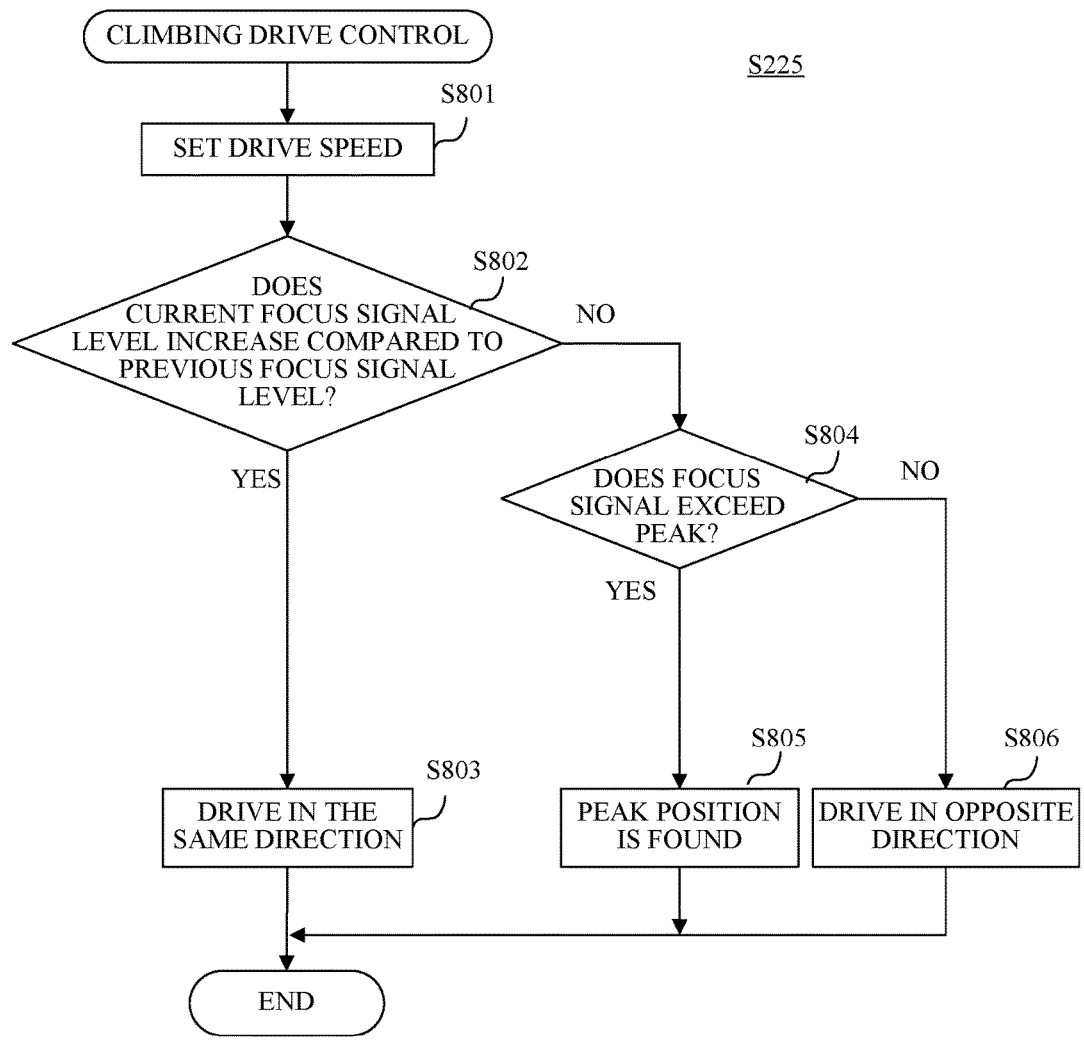
FIG. 8 is a flowchart of illustrating climbing drive in this embodiment.

Next, referring to FIG. 8, climbing drive control (climbing drive mode or search drive mode) in the TV-AF control will be described. FIG. 8 is a flowchart of illustrating an operation of the climbing drive control (step S225 in FIG. 2B). Each step of FIG. 8 is performed mainly by an instruction of the camera/AF microcomputer 114.

First, at step S801, the camera/AF microcomputer 114 sets a drive speed of the focus lens 105. Subsequently, at step S802, the camera/AF microcomputer 114 determines whether a level of a current focus signal increases compared to a level of a previous focus signal. When the current level of the focus signal increases compared to the level of the previous focus signal, the flow proceeds to step S803. On the other hand, when the current level of the focus signal does not increase compared to the level of the previous focus signal, the flow proceeds to step S804. At step S803, the camera/AF microcomputer 114 performs climbing drive of the focus lens 105 in the same direction as the previous direction based on the speed set at step S801.

At step S804, the camera/AF microcomputer 114 determines whether the level of the focus signal exceeds a peak (i.e., whether the level of the focus signal decrease after reaching the peak). When the level of the focus signal exceeds the peak, the flow proceeds to step S805. On the other hand, when the level of the focus signal does not exceed the peak, the flow proceeds to step S806. At step S805, the camera/AF microcomputer 114 determines that it found the peak position. At step S806, the camera/AF microcomputer 114 performs the climbing drive of the focus lens 105 in an opposite direction to the previous direction based on the speed set at step S801. Repeating step S806 while the climbing drive mode is set means that the focus lens 105 is in a hunting state since a variation of the focus signal for an object cannot be sufficiently obtained.

As described above, in this embodiment, the controller (camera/AF microcomputer 114) performs the minute drive (wobbling) of reciprocating the focus lens 105 in the optical axis direction in the in-focus control (focusing). The controller changes each of the reciprocation period (minute drive period or wobbling period) and the predetermined frequency band (BPF band) depending on the focus state or the image capturing condition in the minute drive. The focus state includes an in-focus state, an almost in-focus state, a defocus state (small-blur state or large-blur state), and the like. The image capturing condition includes a state of the image capturing apparatus, for example, a panning state of the image capturing apparatus.

Preferably, when the focus state is not the almost in-focus state in the minute drive, the controller changes each of the reciprocation period and the predetermined frequency band. More preferably, when the focus state is not the almost in-focus state in the minute drive, the controller shortens the reciprocation period and lowers the predetermined frequency band.

Preferably, when the controller determines that the focus state is not the almost in-focus state while generating the focus signal with a first period (4V period) and a component of a first frequency band (low BPF band), it changes the first period to a second period (2V period) and also changes the first frequency band to a second frequency band (ultralow BPF band). More preferably, the second period is shorter than the first period. Preferably, the second frequency band is lower than the first frequency band. Preferably, when the controller determines that the focus state is the almost in-focus state while performing the minute drive with the second period, it changes the reciprocation period from the second period to the first period. Preferably, when the controller determines that the focus state is the almost in-focus state (for example, within the range of the area 403 in FIG. 4) while generating the focus signal by using the component of the second frequency band, it changes the predetermined frequency band from the second frequency band to the first frequency band.

Preferably, the controller performs search drive (climbing drive) of searching a position where the focus signal is maximized while moving the focus lens in one of the optical axis directions in the in-focus control. When the controller changes the minute drive to the search drive while performing the minute drive and generating the focus signal by using the component of the second frequency band, it changes the predetermined frequency band from the second frequency band to the first frequency band.

According to this embodiment, the direction determination performance is improved even in a large-blur state and a time required for achieving the in-focus state is shortened by reduction of the direction determination time, and as a result it is possible to reduce recording blurred images for a long time. In particular, this embodiment is effective to a lens, an image capturing apparatus, or a mode where a depth of focus is shallow. Thus, according to this embodiment, a control apparatus, an image capturing apparatus, a control method, and a non-transitory computer-readable storage medium which are capable of performing high-speed in-focus control can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-074871, filed on Apr. 4, 2016, which is hereby incorporated by reference herein in its entirety.

What is claimed is:

1. A control apparatus comprising:
a focus signal generator configured to generate a focus signal by using a component of a predetermined frequency band of an image signal; and
a controller configured to perform in-focus control based on the focus signal,
wherein the controller is configured to:
perform minute drive of reciprocating a focus lens in an optical axis direction in the in-focus control, and
change each of a reciprocation period and the predetermined frequency band depending on a focus state or an image capturing condition in the minute drive.

2. The control apparatus according to claim 1, wherein when the focus state is not an almost in-focus state in the minute drive, the controller changes each of the reciprocation period and the predetermined frequency band.

3. The control apparatus according to claim 2, wherein when the focus state is not the almost in-focus state in the minute drive, the controller shortens the reciprocation period and lowers the predetermined frequency band.

4. The control apparatus according to claim 1, further comprising a band-pass filter configured to extract a component of the predetermined frequency band from the image signal,
wherein the signal generator is configured to generate the focus signal by using the component of the predetermined frequency band extracted by the band-pass filter.

5. The control apparatus according to claim 1, wherein when the controller determines that the focus state is not the almost in-focus state while setting a first period as the reciprocation period and generating the focus signal by using a component of a first frequency band as the component of the predetermined frequency band in the minute drive, the controller changes the reciprocation period to a second period and changes the component of the predetermined frequency band to a second frequency band.

6. The control apparatus according to claim 5, wherein the second period is shorter than the first period.

7. The control apparatus according to claim 5, wherein the second frequency band is lower than the first frequency band.

8. The control apparatus according to claim 5, wherein when the controller determines that the focus state is the almost in-focus state while performing the minute drive with the second period, the controller changes the reciprocation period from the second period to the first period.

9. The control apparatus according to claim 5, wherein when the controller determines that the focus state is the almost in-focus state while generating the focus signal by using the component of the second frequency band as the predetermined frequency band, the controller changes the predetermined frequency band from the second frequency band to the first frequency band.

10. The control apparatus according to claim 5,
wherein the controller performs search drive of searching a position where the focus signal is maximized while moving the focus lens in one of the optical axis directions in the in-focus control, and wherein when the controller changes the minute drive to the search drive while performing the minute drive and generating the focus signal by using the component of the second frequency band, the controller changes the predetermined frequency band from the second frequency band to the first frequency band.

11. The control apparatus according to claim 5, further comprising a panning detector, wherein when the panning detector detects panning, the controller sets the reciprocation period to the second period while the panning is detected and until a predetermined time period passes after the panning is not detected.

12. The control apparatus according to claim 5, wherein the focus signal generator generates a plurality of focus signals that correspond to respective components of a plurality of frequency bands, and wherein the controller changes, as the component of the predetermined frequency band, a component of a lowest frequency band in the plurality of frequency bands to the second frequency band.

13. The control apparatus according to claim 5, wherein when at least one of conditions where a rate of a maximum value of the focus signal with respect to a maximum value of a contrast value for each horizontal line of the image signal is not less than a predetermined rate and the number of times where the focus lens reciprocates at a position where the focus signal indicates the maximum value within a predetermined range is not less than a predetermined number of times is satisfied, the controller determines that the focus state is the almost in-focus state.

14. The control apparatus according to claim 13, wherein the controller changes the predetermined range depending on the reciprocation period.

15. The control apparatus according to claim 14, wherein when the reciprocation period is the first period, the controller sets a first range as the predetermined range, and wherein when the reciprocation period is the second period, the controller sets, as the predetermined range, a second range wider than the first range.

16. The control apparatus according to claim 5, wherein when the reciprocation period is the second period, the controller changes a drive timing of the focus lens depending on at least one of a readout time of the image signal, a charge accumulation time of the image signal, and a drive amount of the focus lens.

17. An image capturing apparatus comprising:

an image sensor configured to photoelectrically convert an optical image formed via an image capturing optical system including a focus lens to output image data;

a focus signal generator configured to generate a focus signal by using a component of a predetermined frequency band of an image signal corresponding to the image data; and a controller configured to perform in-focus control based on the focus signal, wherein the controller is configured to:

perform minute drive of reciprocating a focus lens in an optical axis direction in the in-focus control, and change each of a reciprocation period and the predetermined frequency band depending on a focus state or an image capturing condition in the minute drive.

18. A control method comprising the steps of:

generating a focus signal by using a component of a predetermined frequency band of an image signal; and performing in-focus control based on the focus signal, wherein performing the in-focus control includes performing minute drive of reciprocating a focus lens in an optical axis direction, and wherein performing the minute drive includes changing each of a reciprocation period and the predetermined frequency band depending on a focus state or an image capturing condition.

19. A non-transitory computer-readable storage medium which stores a program causing a computer to execute a process comprising:

generating a focus signal by using a component of a predetermined frequency band of an image signal; and performing in-focus control based on the focus signal, wherein performing the in-focus control includes performing minute drive of reciprocating a focus lens in an optical axis direction and wherein performing the minute drive includes changing each of a reciprocation period and the predetermined frequency band depending on a focus state or an image capturing condition.

* * * * *